US009842404B2

United States Patent
Freeman et al.

(10) Patent No.: US 9,842,404 B2
(45) Date of Patent: *Dec. 12, 2017

(54) METHODS AND APPARATUS FOR REFRACTIVE FLOW MEASUREMENT WITH THREE DIMENSIONS AND UNCERTAINTY

(71) Applicant: Massachusetts Institute of Technology, Cambridge, MA (US)

(72) Inventors: William T. Freeman, Acton, MA (US); Frederic Durand, Somerville, MA (US); Tianfan Xue, Cambridge, MA (US); Michael Rubinstein, Somerville, MA (US); Neal Wadhwa, Cambridge, MA (US)

(73) Assignee: Massachusetts Institite of Technology, Cambridge, MA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/279,266

(22) Filed: May 15, 2014

(65) Prior Publication Data
US 2014/0340502 A1 Nov. 20, 2014

Related U.S. Application Data

(60) Provisional application No. 61/980,521, filed on Apr. 16, 2014, provisional application No. 61/823,580, filed on May 15, 2013.

(51) Int. Cl.
*H04N 7/18* (2006.01)
*G01P 3/36* (2006.01)
(Continued)

(52) U.S. Cl.
CPC ............... *G06T 7/20* (2013.01); *G01P 5/001* (2013.01); *G02B 27/54* (2013.01); *G06T 7/246* (2017.01);
(Continued)

(58) Field of Classification Search
CPC .. G01P 5/001; G01P 5/26; G06T 2207/10016; G06T 2207/10021;
(Continued)

(56) References Cited

U.S. PATENT DOCUMENTS 5,491,642 A * 2/1996 Wormell ................. G01P 5/001
356/28
8,063,379 B2 * 11/2011 Suhami ..................... G01T 5/02
250/370.09
(Continued)

FOREIGN PATENT DOCUMENTS

WO    WO 2014/186611 A2    11/2014

OTHER PUBLICATIONS

Alterman, M., et al., "Detecting Motion Through Dynamic Refraction," *IEEE Transactions on Pattern Analysis and Machine Intelligence, IEEE Computer Society, USA* 35(1): 245-251 (2013).
(Continued)

*Primary Examiner* — Helen Shibru
(74) *Attorney, Agent, or Firm* — Hamilton, Brook, Smith & Reynolds, P.C.

(57) ABSTRACT

An imaging method and corresponding apparatus according to an embodiment of the present invention enables measurement and visualization of fluid flow. An embodiment method includes obtaining video captured by a video camera with an imaging plane. Representations of motions in the video are correlated. A textured background of the scene can be modeled as stationary, with a refractive field translating between background and video camera. This approach offers multiple advantages over conventional fluid flow visualization, including an ability to use ordinary video equipment outside a laboratory without particle injection. Even natural backgrounds can be used, and fluid motion can be distinguished from refraction changes. Depth and three-dimen-
(Continued)

sional information can be recovered using stereo video, and uncertainty methods can enhance measurement robustness where backgrounds are less textured. Example applications can include avionics and hydrocarbon leak detection.

24 Claims, 23 Drawing Sheets
(10 of 23 Drawing Sheet(s) Filed in Color)

(51) Int. Cl.
    *G01V 3/00*     (2006.01)
    *G06T 7/20*     (2017.01)
    *G02B 27/54*     (2006.01)
    *G01P 5/00*     (2006.01)
    *G06T 7/246*     (2017.01)
    *G01P 5/26*     (2006.01)

(52) U.S. Cl.
    CPC ...... *G01P 5/26* (2013.01); *G06T 2207/10016* (2013.01); *G06T 2207/10021* (2013.01); *G06T 2207/10056* (2013.01); *G06T 2207/30241* (2013.01)

(58) Field of Classification Search
    CPC . G06T 2207/10056; G06T 2207/30241; G06T 7/20; G06T 7/2033
    USPC .............................. 348/79; 324/353; 356/28
    See application file for complete search history.

(56) References Cited

U.S. PATENT DOCUMENTS

| | | | |
|---|---|---|---|
| 8,233,701 B2 | 7/2012 | Frakes et al. | |
| 9,068,884 B1 | 6/2015 | Tillotson | |
| 9,558,564 B1* | 1/2017 | Korchev | G06T 7/20 |
| 9,710,917 B2* | 7/2017 | Freeman | G06T 7/20 |
| 2013/0300948 A1* | 11/2013 | Jannard | G02B 27/26 348/756 |
| 2013/0345994 A1* | 12/2013 | Wiklund | G01F 1/34 702/46 |
| 2015/0016690 A1 | 1/2015 | Freeman et al. | |

OTHER PUBLICATIONS

Alterman, M., et al., "Triangulation in Random Refractive Distortions," *Computational Photography (ICCP), 2013 IEEE International Conference on, IEEE*,(2013).
PCT/US2014/038255 Notification of Transmittal of International Search Report and the Written Opinion of the International Searching Authority, or the Declaration dated Dec. 2, 2014 entitled "Refractive Flow Measurement System."
Mittelstaedt et al., "A noninvasive method for measuring the velocity of diffuse hydrothermal flow by tracking moving refractive index anomalies," *Geochemistry, Geophysics, Geosystems*, 11(10): 1-18 (Oct. 8, 2010), retrieved from internet: http://onlinelibary.wiley.com/doi/10.1029/2010GC003227/full.
Arnaud, E., et al., "A Fluid Motion Estimator for Schlieren Image Velocimetry", *European Conference on Computer Vision (ECCV)*, Graz, Austria, pp. 198-2010 (2006).
Atcheson, B., et al., "Time-Resolved 3D Capture of Non-Stationary Gas Flows", *ACM SIGGRAPH Asia*, 27(5): Article No. 132, 9 pages, (2008).
Baker, S., et al., "A Database and Evaluation Methodology for Optical Flow", *Int J Comput Vis*, 92: 1-31 (2011).
Dalziel, S.B., et al., "Whole-Field Density Measurements by 'Synthetic Schlieren'", *Experiments in Fluids*, 28: 322-335 (2000).
Ding, Y., et al., "Dynamic Fluid Surface Acquisition Using a Camera Array", $13^{th}$ *International Conference on Computer Vision (ICCV)*, Barcelona, Spain, 2478-2485 (2011).
Elsinga, G.E., et al., "Assessment and Application of Quantitative Schlieren Methods: Calibrated Color Schlieren and Background Oriented Schlieren", Experiments in Fluids, 36: 309-325 (2004).
Fleet, D.J. and Weiss, Y., "Optical Flow Estimation", *In Mathematical Models in Computer Vision: The Handbook*, N. Paragois, et al., eds. (Springer online), pp. 239-258 (2005).
Goldhahn, E and Seume, J., "Background Oriented Schlieren Techniques- Sensitivity, Accuracy, Resolution and Application to a Three-Dimensional Density Field", $13^{th}$ *Int. Symp on Applications of Laser Techniques to Fluid Mechanics*, Lisbon Portugal, (Jun. 2006), 11 pages.
Hargather, M.J. and Settles, G.S., "Natural-Background-Oriented Schlieren Imaging", *Exp. Fluids*, 48(1): 59-68 (2010).
Horn, B.K.P. and Schunck, B.G., "Determining Optical Flow", *Artificial Intelligence*, 17: 185-203 (1981).
Jonasscn, D.R., et al., "Schlieren "PIV" for Turbulent Flows", *Optics and Lasers in Engineering*, 44: 190-207 (2006).
Kline, S.J., "Film Notes for Flow Visualization", *National Committee for Fluid Mechanics Films*, No. 21607 : 1-5 (1969).
Liu, C., "Beyond Pixels: Exploring New Representations and Applications for Motion Analysis." Unpublished doctoral Thesis, Massachusetts Insitute of Technology, Cambridge, MA (2009).
Lucas, B.D. and Kanadc, T., "An Iterative Image Registration Technique With an Application to Stereo Vision", *Proc. $7^{th}$ Intl Joint Conf on Artificial Intelligence (IJCAI)*, Vancouver, British Columbia, (Aug. 1981), pp. 121-130.
Meier, G.E.A., "Computerized Background-Oriented Schlieren", *Experiments in Fluids*, 33: 181-187 (2002).
Merzkirch, W., "Addition of Foreign Materials into Gaseous and Liquid Fluid Flows." In *Flow Visualization*, (Florida, Academic Press, Inc.), Chapter 2, pp. 5-29 (1987).
Morris, N.J.W., et al., "Dynamic Refraction Stereo", $10^{th}$ *IEEE International Conference on Computer Vision*, Bejing, China, 2: 1573-1580 (2005).
Raffel, M., et al., "Background Oriented Stereoscopic Schlieren (BOSS) for Full-Scale Helicopter Vortex Characterization", $9^{th}$ *International Symposium on Flow Visualization*, Edinburgh, Paper No. 450, 11 pages (2000).
Richard, H. and Raffel, M., "Principle and Applications of the Background Oriented Schlieren (BOS) Method", *Measurement Science and Technology*, 12: 1576-1585 (2001).
Ruhnau, Rp, et al., "On-Line Variational Estimation of Dynamical Fluid Flows With Physics-Based Spatio-Temporal Regularization", *Pattern Recognition $28^{th}$ DAGM Symposium*, Berlin, Germany, pp. 444-454 (2006).
Schardin, v.H., "Die Schlierenverfahren and ihre anwendungen." In *Ergebnisse der exakten Natuwissenschaften*, (Springer Belin), pp. 303-439 (1942).
Scharstein, D. and Szeliski, R., "A Taxonomy and Evaluation of Dense Two-Frame Stereo Correspondence Algorithms", *International Journal of Computer Vision*, 47(1-3): 7-42 (2002).
Settles, G.S., "Schlieren and Shadowgraph Techniques Visualizing Phenomena in Transparent Media." In *Experimental Fluid Mechanics*, Adrian, R.J., et al., eds., (Springer-Verlag Berlin Heidelberg GmbH), Chapter 1, Historical Background, pp. 1-24 (2001).
Settles, G.S., "The Penn State Full-Scale Schlieren System", $11^{th}$ *International Symposium on Flow Visualization*, Notre Dame Indiana, USA, 12 pages (2004).
Stam, J., "Stable Fluids", *SIGGRAPH*, Los Angeles, CA, USA, Proceedings of the 26th Annual Conference on Computer Graphics and Interactive Techniques, pp. 121-128 (1999).
Tian, Y., et al., "Depth From Optical Turbulence", *IEEE Conference on computer Vison and Pattern Recognition (CVPR)*, Providence, RI, USA, 8 pages (2012).
Wadhwa, N., et al., "Phase-Based Video Motion Processing", *SIGGRAPH*, Anaheim, CA, USA, $40^{th}$ International Conference and Exhibition on computer Graphics and Interactive Techniques,9 pages (2013).
Wetzstein, G., et al., "Hand-Held Schlieren Photography With Light Field Probes", *ICCP, International Conference on Computational Photography*, Pittsburgh, PA, USA, 8 pages (2011).

(56) References Cited

OTHER PUBLICATIONS

Ye, J., et al., "Angular Domain Reconstruction of Dynamic 3D Fluid Surfaces", *IEEE Conference on computer Vison and Pattern Recognition (CVPR)*, Providence, RI, USA, 8 pages (2012).

Douay, et al., "Stereoscopic PIV Using Optical Flow: Application to a Cavity Recirculation," *Experiments in Fluids*, 54(8): 1579-1594 (2013).

International Preliminary Report on Patentability for Int'l Application No. PCT/US2014/038255, titled "Refractive Flow Measurement System," dated Nov. 17, 2015.

Final Office Action for U.S. Appl. No. 14/279,254, entitled: "Methods and Apparatus for Refractive Flow Measurement with Three Dimensional and Uncertainty," dated Nov. 4, 2016.

Interview Summary for U.S. Appl. No. 14/279,254, entitled: "Methods and Apparatus for Refractive Flow Measurement with Three Dimensional and Uncertainty," dated Mar. 17, 2017.

Murase, H., "Surface Shape Reconstruction of a Nonrigid Transparent Object Using Refraction and Motion," *IEEE Transactions on Pattern Analysis and Machine Intelligence*, vol. 14; No. 10; 1045-1052.

Notice of Allowance for U.S. Appl. No. 14/279,254, entitled: "Methods and Apparatus for Refractive Flow Measurement with Three Dimensional and Uncertainty," dated Jan. 27, 2017.

Notice of Allowance for U.S. Appl. No. 14/279,254, entitled: "Methods and Apparatus for Refractive Flow Measurement with Three Dimensional and Uncertainty," dated May 3, 2017.

Office Action for U.S. Appl. No. 14/279,254, entitled: "Methods and Apparatus for Refractive Flow Measurement with Three Dimensional and Uncertainty," dated Feb. 17, 2016.

\* cited by examiner

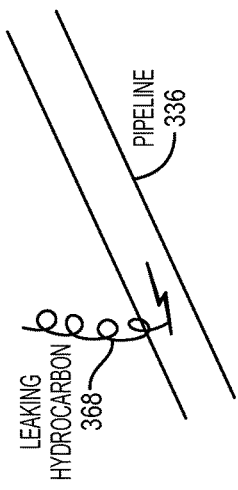
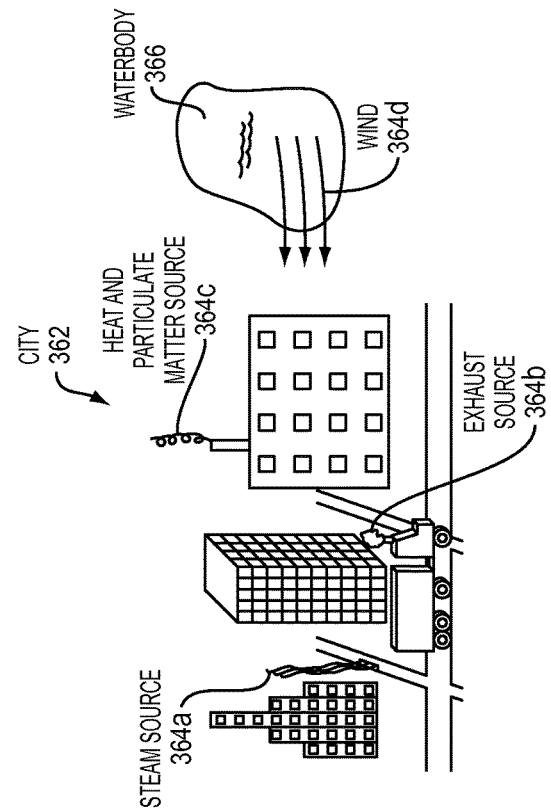
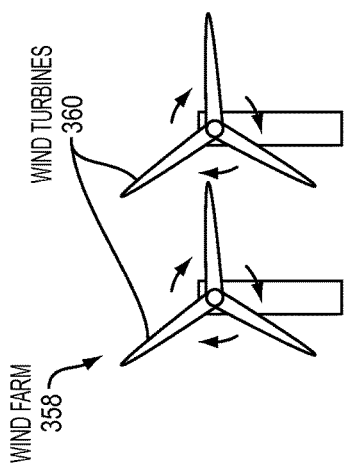
FIG. 3E
FIG. 3D
FIG. 3C

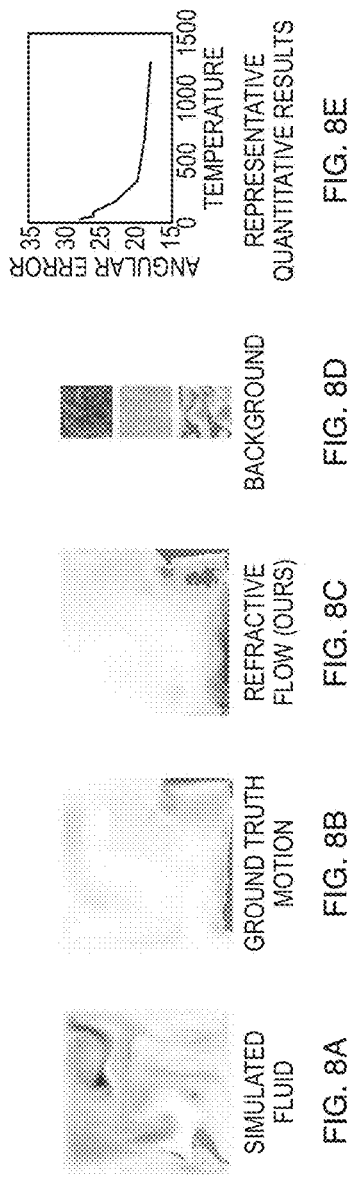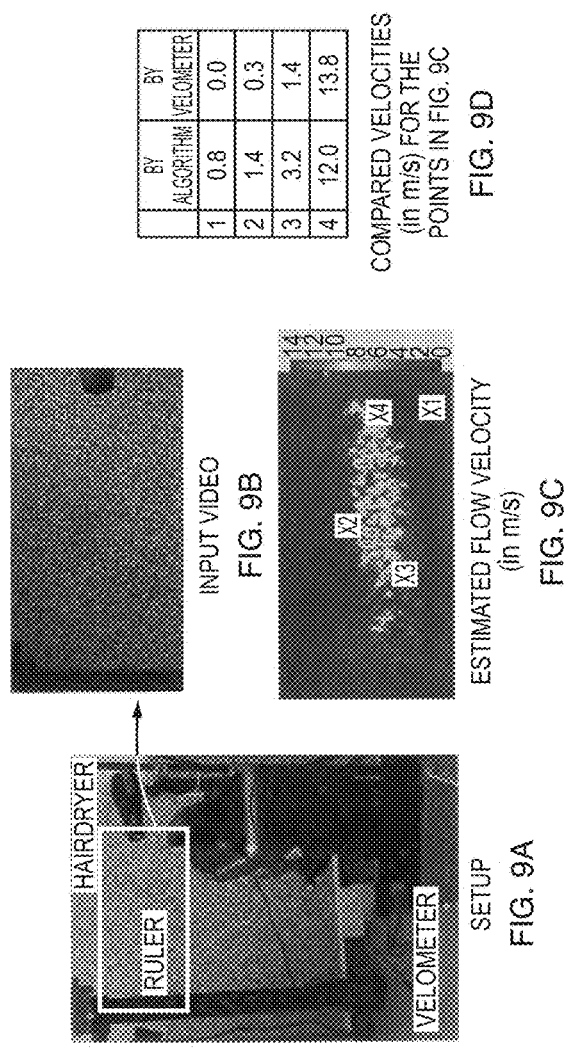

METHODS AND APPARATUS FOR REFRACTIVE FLOW MEASUREMENT WITH THREE DIMENSIONS AND UNCERTAINTY

RELATED APPLICATION

This application claims the benefit of U.S. Provisional Application No. 61/980,521, filed on Apr. 16, 2014 and U.S. Provisional Application No. 61/823,580, filed on May 15, 2013. The entire teachings of the above applications are incorporated herein by reference.

GOVERNMENT SUPPORT

This invention was made with government support under Contract No. N00014-10-1-0951 awarded by the U.S. Navy. The government has certain rights in the invention.

BACKGROUND OF THE INVENTION

Measurement and visualization of air and fluid movement is useful in such areas as aeronautical engineering, combustion research, and ballistics. Various techniques have been proposed for measuring and visualizing fluid motion, and they can be based on computation of optical flow in a video using an assumption of brightness constancy. Previously proposed techniques have included sound tomography, Doppler LIDAR, and schlieren photography.

Two general techniques to visualize and measure fluid flow include introduction of a foreign substance and optical techniques. In foreign-substance techniques, substances such as a dye, smoke, or particles are introduced into a fluid and then tracked to deduce fluid motion. Optical techniques can include schlieren photography, for example, in which an optical setup is used to amplify deflections of light rays due to refraction to make the fluid flow visible. An alternative to standard schlieren photography is background-oriented schlieren photography (or synthetic schlieren photography), in which fluid flow between each frame of a video and an undistorted reference frame is computed in an attempt to recover fluid motion.

SUMMARY OF THE INVENTION

Current techniques for visualizing and measuring fluid flow have multiple disadvantages and limitations. For example, they are often based on complicated or expensive setups or are limited to in-lab use. One example is the schlieren photography arrangement. Schlieren photography relies on a source grid in the background of the subject of the photography, as well as a camera configuration that includes a cutoff grade and lamps to illuminate the background source. Thus, it can be difficult to apply this technique outside of the laboratory setup. Furthermore, even background-oriented schlieren photography, or synthetic schlieren, relies on having a background in focus and a light field probe as large as the target fluid flow of interest. Moreover, foreign substance techniques require the cost and inconvenience of seeding a fluid with particles, may be limited to special studies, and is not suitable for monitoring in everyday use.

Moreover, the core assumption of brightness constancy on which standard optical flow techniques are based does not hold for a refractive fluid. Brightness constancy does not hold for refractive fluids because intensity changes occur due to both translation of the fluid and refractive effects of the fluid motion. The failure of the brightness constancy assumption can lead to both incorrect magnitude of motion and incorrect direction of motion for standard fluid flow calculations.

Embodiments of the current invention can remedy these deficiencies by using refractive flow calculations. Refraction flow calculations do not ultimately depend upon an assumption of brightness constancy, but instead use a principle of refractive constancy. Refractive constancy can be applied to extract measurements and visualizations of fluid flow using standard video images, without laboratory setups, artificial backgrounds, or seeding with foreign substances. Embodiments enable fluid flow visualization and measurement using either artificial or natural backgrounds that are at least partially textured. Embodiments can be used outside of a laboratory environment in such diverse applications as airport and in-flight turbulence monitoring, monitoring for leaks of fluids such as hydrocarbons, wind turbine optimization, civil engineering, augmented reality, virtual reality, aeronautical engineering, combustion research, and ballistics.

In one embodiment, for example, video images are captured by a standard video camera, and standard optical flow techniques are applied, assuming that frame-to-frame changes in intensity or phase are caused by motions of the fluid alone. Afterward, the apparent motions derived from the optical flow technique are used to estimate actual motions by applying a refractive constancy principle in which motions of a refractive field are considered to be an exclusive cause of the apparent motions. A textured background is modeled as being a stationary background, and a fluid is modeled as being a refractive field translating between the textured background and the video camera. Two-dimensional velocities of elements of the refractive field are calculated based upon the actual motions, and the two-dimensional velocities are output for visualization as an augmented reality scene in which a real-life scene is displayed and overlaid with velocity vectors showing the fluid motion. The display is then used to monitor for turbulence, leaks, updrafts, or to optimize a wind farm based on fluid flow around wind turbines. The display may be, for example, a standard video or computer screen display or an augmented reality eyewear or virtual reality device.

A method and a corresponding apparatus according to an embodiment of the invention include obtaining video captured by a video camera with an imaging plane. The method can also include correlating, via a processor, over time, representations of motions in the video from frame to frame as a function of motion of a refractive field through which light from a textured background passes to the imaging plane. The textured background can be a natural background or an artificial background.

Correlating the representations of the apparent motions can include modeling the textured background as a stationary background and the refractive field as translating between the textured background and the video camera. Correlating can further include considering the apparent motions to be constant from one video frame to another video frame and estimating actual motions based on the determined representations of the apparent motions by assuming that motions of the refractive field are an exclusive cause of the apparent motions. The representations of the motions can be representations of apparent motions observed at the imaging plane, and the method can further include determining the representations of the apparent motions by assuming that frame-to-frame changes in at least one of intensity and phase are caused by the motions alone.

The method can also include calculating a velocity of the refractive field based upon the correlated representations of the motions. The motion of the refractive field can be motion of a fluid, and changes in refractive indices of the refractive field can arise from motion of one or more refractive objects in the fluid, and the representations of motions can be representations of motions of the one or more refractive objects. The one or more refractive objects can include, for example, at least one of a small particle, molecule, region of the fluid differing in temperature from a surrounding region, region of fluid differing in pressure from a surrounding region, droplet, bubble, exhaust, hydrocarbon, or volatile substance. The fluid may be a gas or liquid, for example.

The method can further include calculating, based on the correlating, a fluid velocity vector field as a function of position in the refractive field. The method can also include displaying a representation of the fluid velocity vector field and displaying the representation in an arrangement with a real-life scene to present an augmented reality scene. The method can include using the fluid velocity vector field to monitor for a hydrocarbon leak or to monitor for at least one of a fluid turbulence, updraft, downdraft, and vortex.

An apparatus according to an embodiment of the invention includes memory configured to store representations of motions in a video obtained from a video camera with an imaging plane. The apparatus can also include a processor configured to correlate, over time, the representations of the motions from frame to frame as a function of motion of a refractive field through which light from a textured background passes to the imaging plane. The representations of the motions can be representations of apparent motions observed at the imaging plane, and the processor can further be configured to correlate the representations of the apparent motions through an assumption of frame-to-frame changes in at least one of intensity and phase resulting from the motions alone. The processor can be configured to correlate the representations of the apparent motions by estimating actual motions based on an assumption that translations of the refractive field are an exclusive cause of the apparent motions. The processor can also be configured to correlate using an approximation that the apparent motions are constant from one video frame to another video frame.

The apparatus can also include a display configured to present a screen view with a representation of the fluid velocity vector field therein. The display can be an augmented reality display configured to register the fluid velocity vector field with a real-life scene in which the fluid velocity vector field is located with respect to a viewing position and angle of a user.

The processor can also be configured to check for a hydrocarbon leak based on the fluid velocity vector field or to use the fluid velocity vector field to check for at least one of a fluid turbulence, updraft, downdraft, and vortex.

A non-transient computer readable medium according to an embodiment of the invention can be programmed with computer readable code that upon execution by a processor causes the processor to obtain video captured by a video camera with an imaging plane. Execution of the computer readable code by the processor can also cause the processor to correlate, over time, representations of motions in the video from frame to frame as a function of motion of a refractive field through which light from a textured background passes to the imaging plane.

A method and corresponding apparatus according to an embodiment of the invention can include obtaining videos captured by at least two video cameras having respective imaging planes. The method can also include correlating, by a processor, over space, representations of motions in the at least two videos from frame to frame as a function of motion of a refractive field through which light passes from a textured background to the respective imaging planes. The method can also include calculating, based on the correlated representations of the motions, a depth of the refractive field through use of the at least two videos.

The method can also include determining, based upon the correlated representations, three-dimensional velocity of the refractive field. The textured background can be out of focus at at least one of the camera imaging planes, and the imaging planes of the at least two video cameras can be parallel to each other.

Correlating the representations of motions in the at least two videos can include matching representations of motions in one of the videos to representations of motions in another of the videos. Correlating the representations can also include assuming that for each given time and for a given spatial position and the at least two videos, the representations of motion corresponding to the given time and spatial position are the same from video to video. The textured background can be a natural textured background.

The method can also include determining an uncertainty of at least one of the depth of the refractive field and a velocity of the refractive field calculated from the correlated representations. Determining the uncertainty can include weighting the representations of motions as a function of variance of an optical flow related to the representations of the motions. Determining the uncertainty can also include defining weighted representations of motions to be a logarithm of a covariance between a representation of motion in one video and a representation of motion in another video. Determining the uncertainty can also include weighting the representations of motions as a function of the degree of texturing of the textured background.

A method and corresponding apparatus according to an embodiment of the invention can include modeling a representation of motion in a video captured by a video camera as arising from motion of a refractive field through which light passes from a stationary background to an imaging plane of the video camera. The method can also include determining and uncertainty in the representation of the motion by a processor. The method can further comprise displaying the representation of motion and displaying the uncertainties in the representation through at least one of shading and color coding the representation of motion. The uncertainties can be applied to single camera embodiments or multiple camera embodiments.

Determining the uncertainty can include calculating a variance of the representation of motion and weighting the representation of motion as a function of the variance. Determining the uncertainty can also include weighting the representation of motion as a function of the degree of texturing of the stationary background. Determining the uncertainty can also include applying an $L_2$ to the norm to the representation of motion and calculating a covariance of a concatenation of the plurality of representations of motion. Determining the uncertainty can further include weighting the representation of motion as a function of a logarithm of a covariance of the representation of motion in the video captured by the video camera and an additional representation of the motion in an additional video captured by an additional video camera.

A system and corresponding method according to an embodiment of the invention includes an imaging module configured to acquire video of a fluid, the imaging module having an imaging surface. The system can also include a processor configured to correlate representations of motions of the fluid in the video from frame to frame as a function of motion of a refractive field through which light passes from a stationary background to the imaging surface. The system can also include a display module configured to display motions of the fluid, wherein the displayed motions are based upon the correlated representations of the motions.

The imaging module can include at least one of a camera, a video camera, and a microscope. The imaging module can be further configured to view at least one of the following: an airfield, atmospheric turbulence, wind farm, biological process, chemical process, hydrocarbon pipeline, solution, and cell culture.

The display module can be a traditional display module (e.g., video or computer display module), virtual reality display module, or augmented reality display module. The display module can be further configured to display the video of the fluid. The display module can be wearable. The stationary background can be a textured stationary background.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3C-3E illustrate various environments in which embodiments can be used for monitoring applications, including wind farms, civil engineering, and hydrocarbon leak monitoring.

FIGS. 8A-8E illustrate quantitative evaluation of a refractive flow method according to an embodiment of the invention.

FIGS. 9A-9D illustrate a controlled experiment performed to evaluate fluid flow velocities estimated using refractive flow method according to an embodiment of the invention.

DETAILED DESCRIPTION OF THE INVENTION

A description of example embodiments of the invention follows.

The teachings of all patents, published applications and references cited herein are incorporated by reference in their entirety.

Measuring and visualizing how air and fluid move is of great importance, and has been the subject of study in broad areas of science and technology, including aeronautical engineering, combustion research, and ballistics. Special techniques may be necessary to visualize fluid flow, and an example is shown in FIG. 1A.

Figure 1A:
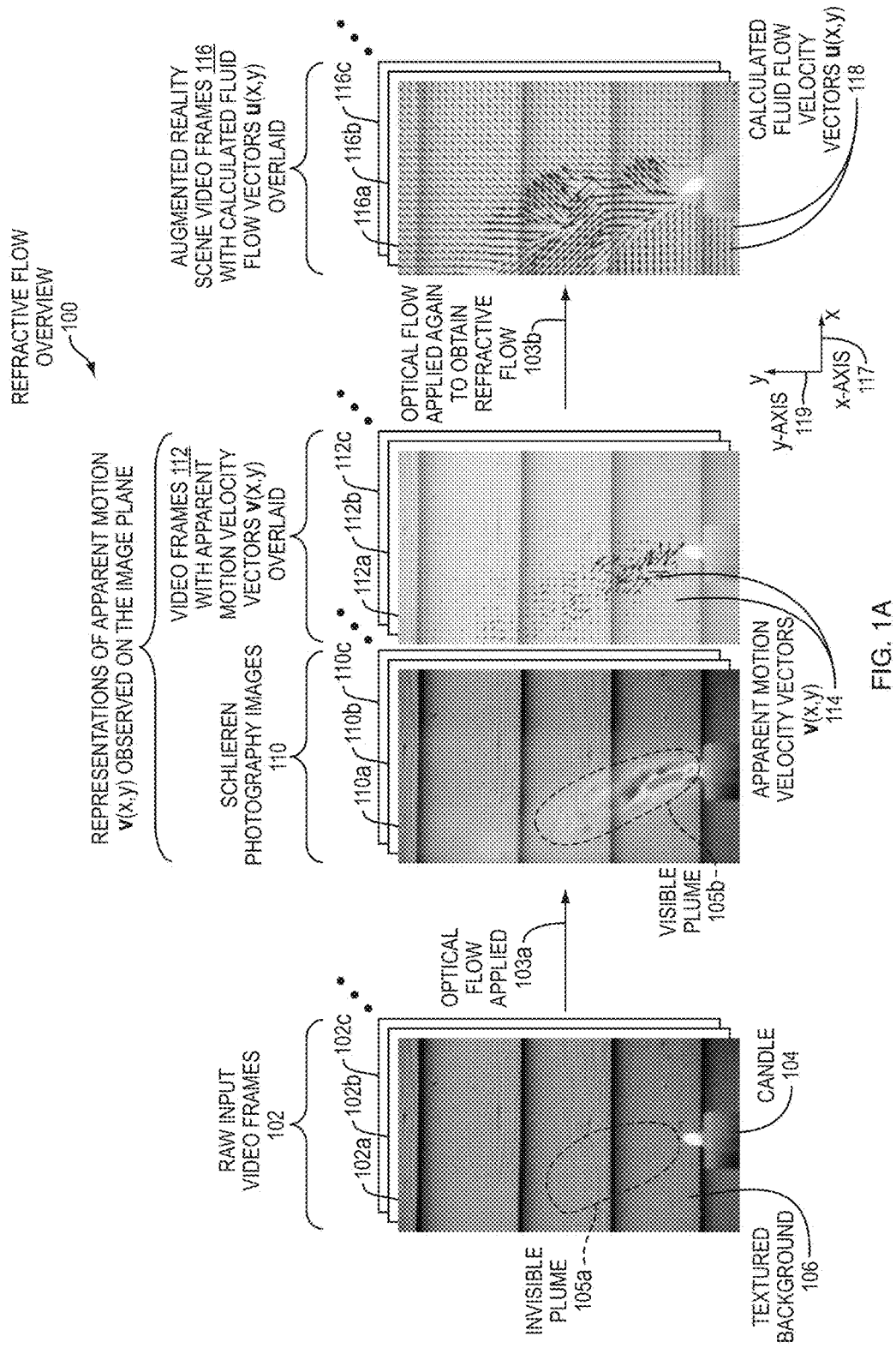
FIG. 1A is an image-based overview of refractive flow principles, including a comparison of results based on optical flow and those based on refractive flow.

FIG. 1A shows images 102 of a burning candle 104. A plume 105a of the candle 104 is invisible to the naked eye and to standard video techniques. The heat rising from the burning candle 104 causes small, invisible distortions of a textured background 106 seen behind the candle 104. The small distortions of the background result from light rays being refracted by the plume 105a as they travel from the background 106 to a camera (not shown). As the air in the candle plume 105a moves, small changes in the refractive properties of the air appeared as small visual deformations, or motions, of the textured background 106. These motions can be referred to as "wiggles" or "refraction wiggles."

Multiple techniques have been proposed for visualizing or measuring such small distortions in fluids, such as sound tomography, Doppler LIDAR and schlieren photography. Current techniques to visualize and measure fluid flow can be divided into two categories: those which introduce a foreign substance (dye, smoke, or particles) into the fluid; and those that use the optical refractive index of the fluid.

Where foreign substances or markers are introduced, the motions of the markers can be used to give a visualization of the fluid flow. Through particle image velocimetry (PIV), a quantitative measurement of the flow can be recovered by tracking the particles introduced into the fluid.

In the optical technique category, schlieren photography is one method. Schlieren photography uses a calibrated, elaborate optical setup that can include a source grid placed behind a photography subject, a cutoff grid incorporated into a special camera, and special lamps for illumination to amplify deflections of light rays due to refraction to make the fluid flow visible. To attempt to remedy some of the limitations of schlieren photography, the schlieren method has been simplified in the past decade. In background-oriented schlieren (BOS) photography (also referred to as "synthetic schlieren"), the complicated, hard-to-calibrate optical setup of traditional schlieren imaging is replaced by a combination of a video of a fluid flow captured in front of an in-focus textured background (such as the textured background 106 shown in FIG. 1A) and optical flow calculations (further described hereinafter). The refraction due to the fluid motion is recovered by computing optical flow between each frame of the video and an undistorted reference frame. A resulting displacement field gives a visualization of the fluid flow.

Continuing to refer to FIG. 1A, this figure provides an example of schlieren photography images, namely the center images 110. The synthetic schlieren photography images 110 were created by applying optical flow calculations to the raw input video frames 102. The application of optical flow calculations is symbolized in FIG. 1A by the arrow 103a. The resulting displacement field provides a visualization of the fluid flow above the candle 104. The displacement field can be presented visually in various ways, including the visible plume 105b in the schlieren photography images 110 and the apparent motion velocity vectors v(x,y) 114 (or representations of the motions or refraction wiggles) overlaid on the video frames 112. The velocity vectors v(x,y) 114 are oriented in an xy plane with an x-axis 117 and y-axis 119.

However, previous techniques have multiple disadvantages. Introduction of foreign substances or markers with use of PIV requires additional expense and is not suitable for continuous monitoring or virtual reality applications, for example. Even for optical techniques, setups can be expensive and limited to laboratory use. A schlieren photography setup, as described above, is an example of such limitations.

BOS presents an additional issue, in that a textured background must be in focus. To address this issue, light-field BOS has been proposed. In light-field BOS, a textured background like the textured background 106 can be replaced by a light field probe in certain instances. However, the light field probe comes at a cost of having to build a light field probe as large as the fluid flow of interest. Besides, for many applications such as continuous monitoring and virtual reality, light field probes would be undesirable or even impossible to use in some cases.

Furthermore, simply computing optical flow in a video will not generally yield the correct motions of refractive elements, because the assumptions involved in these computations do not hold for refractive fluids. Optical techniques such as schlieren photography rely on a brightness constancy assumption. Under the assumption of brightness constancy (explained further hereinafter), any changes in pixel intensities are assumed to be caused only by translation of the photographed objects. However, even if the brightness constancy holds for solid, reflecting objects, brightness constancy does not typically hold for refractive fluids such as the plume 105a-b of the candle 104 in FIG. 1A. In the case of refractive fluids, changes in pixel intensities result from both translation and refraction of the fluid. Thus, optical flow does not yield actual motion of a refractive fluid, but rather how much an image projected through the refractive fluid onto the imaging plane of a camera moves.

Disclosed herein is a novel method to measure and visualize fluid flow. Even complicated airflows, for example, can be measured, without elaborate optical equipment. Binocular videos are not necessarily required, and two-dimensional (2D) fluid flow can be derived even from standard monocular videos. Embodiments disclosed herein apply a recognition that local changes in intensity may be locally invariant, and an observed scene can be modeled as being composed of a static background occluded by refractive elements that bend light and move through space. Embodiments of the current invention include computing the optical flow of the optical flow by re-deriving the optical flow equation for a proposed image formation model. As used herein, "video" denotes any format that includes a series of images of a scene over time, and "video camera" denotes any instrument capable of capturing such a series of images. Video cameras can be camera configured to capture a series of images at a standard 30 frames per second (fps), or a higher or lower speeds, or a camera that takes single photographs at similar rates, not necessarily at a constant frame rate.

Embodiments can rely on fluid flows of interest containing moving refractive structures, which are almost always present in fluid flows of interest. Embodiment methods can track features that move with the fluid to recover the fluid flow (also called refractive flow, or calculated or actual fluid flow). Advantageously, fluid flow can be obtained without the added cost of seeding a fluid with particles and are thus markerless. Embodiments can use the displacement field (the field resulting from an initial computation of optical flow) to construct features to track and can be implemented outside a laboratory and even on mobile devices.

Continuing with the description of FIG. 1A, the velocity vectors v(x,y) 114 are referred to as apparent motion velocity vectors because, as described above, simply applying optical flow based on brightness constancy fails due to detected intensities being caused by both translation of the plume 105 and refraction imparted by the plume. Changes in the apparent motion velocity vectors between the frames 112a, b, c . . . can be used as an indicator of the motion of the transparent fluid, and the disparity of these motion features between viewpoints of two cameras, for example, can be used to determine the depth of the fluid. Optical flow may be applied again, as represented by an arrow 103b, to obtain refractive flow according to embodiments of the invention. Optical flow is applied again by a processor, which is configured to correlate, over time, the representations of motions in the video frames 112 from frame to frame as a function of motion of the refractive field of the plume 105.

Correlating representations of motion can be done in accordance with methods described hereinafter in conjunction with FIGS. 5A and 5B, for example. Correlating over time can include tracking or matching observed, apparent motions represented by, for example, the vectors 114, over the video frames 112a, b, c, and so forth, for example. Representations of motions can additionally be correlated over space by tracking the representations over video frames from a single camera or multiple cameras. The correlation can be done as a function of motion of a refractive field where, in the correlation, the represented, observed are assumed to arise from motion of a refractive field, with a background of the refractive field being stationary, for example.

Light from the textured background 106 passes through the candle plume 105 to an imaging plane of a video camera (not shown). Optical flow is applied to obtain apparent motion velocity vectors v(x,y) 114, and the apparent motion velocity vectors of the video frames 112 are correlated through applying optical flow again to obtain refractive flow.

The results of refractive flow are shown in FIG. 1A in the form of calculated fluid flow velocity vectors u(x,y) 118 overlaid on video frames 116. Together, the video frames 116 with the calculated fluid flow velocity vectors u(x,y) 118 constitute a representation of a scene, which varies over time in successive video frames 116a, 116b, 116c, and so forth.

Figure 1B:
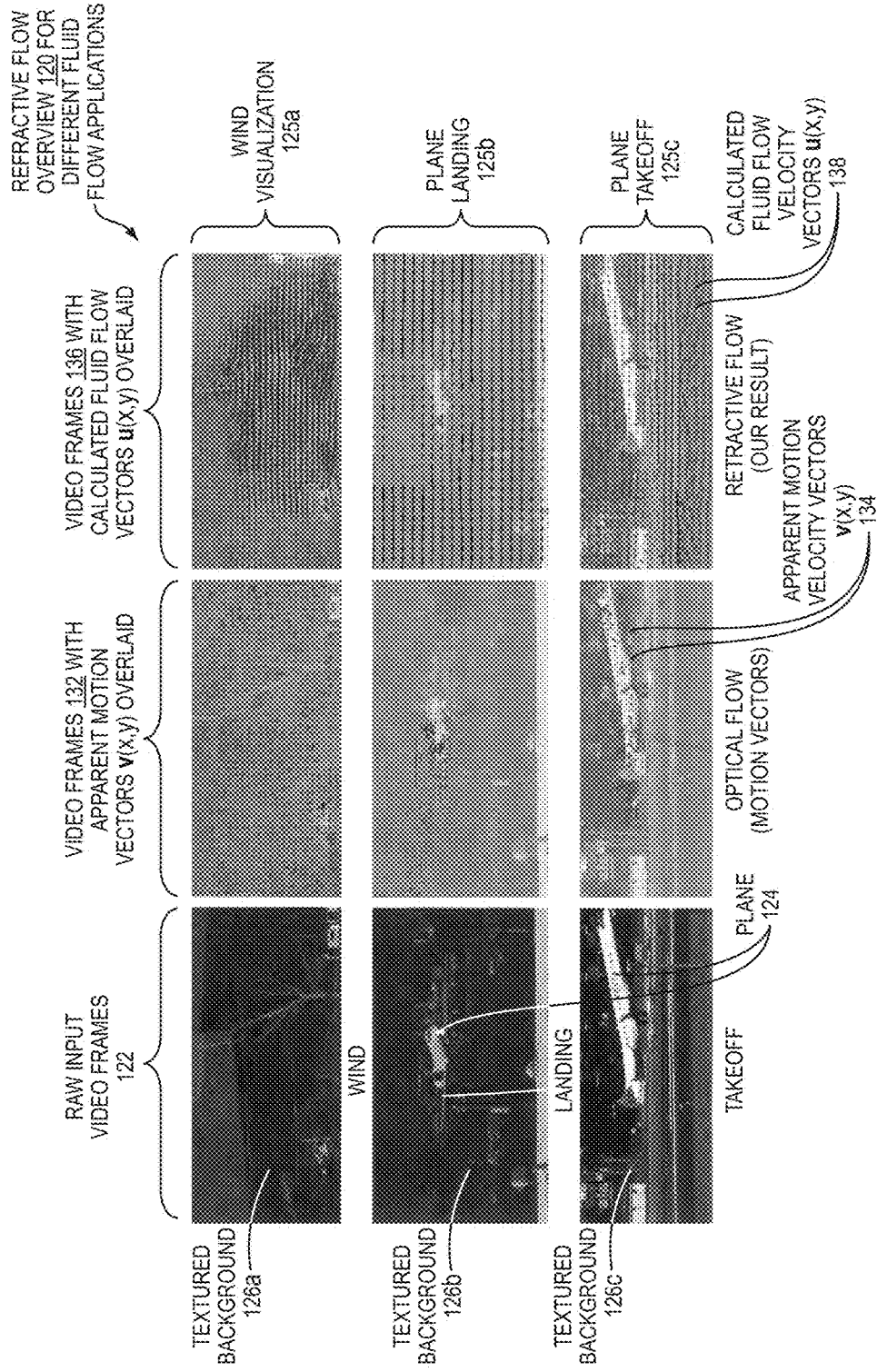
FIG. 1B is an overview of refractive flow similar to the overview in FIG. 1A, but with different target scenes and textured backgrounds.

FIG. 1B is a refractive flow overview 120, similar to the refractive flow overview 100 in FIG. 1A, showing results of applying example methods described hereinafter in fluid flow applications. The applications illustrated in FIG. 1B include wind visualization 125a, landing 125b of a plane 124, and takeoff 125c of the plane 124. Each application includes a different textured background 126. In the wind visualization 125a, the textured background 126a consists primarily of a natural background including trees. In contrast, the textured backgrounds 126b and 126c contain many elements made by humans. Thus, FIG. 1B illustrates how a wide variety of different textured backgrounds can be used, including both natural and artificial elements, to obtain refractive flow measurements with standard video images.

In FIG. 1B, the process of obtaining refractive flow is similar to that illustrated in FIG. 1A. Namely, optical flow is applied to raw input video frames 122 to obtain representations of apparent motion observed at the imaging plane of the camera (not shown). These representations are presented in the form of video frames 132 with apparent motion vectors v(x,y) 134 overlaid the representations in the video frames 132 are correlated by again applying optical flow to obtain refractive flow measurements, which are represented by the video frames 136 with calculated fluid flow vectors u(x,y) 138 overlaid.

Figure 1C:
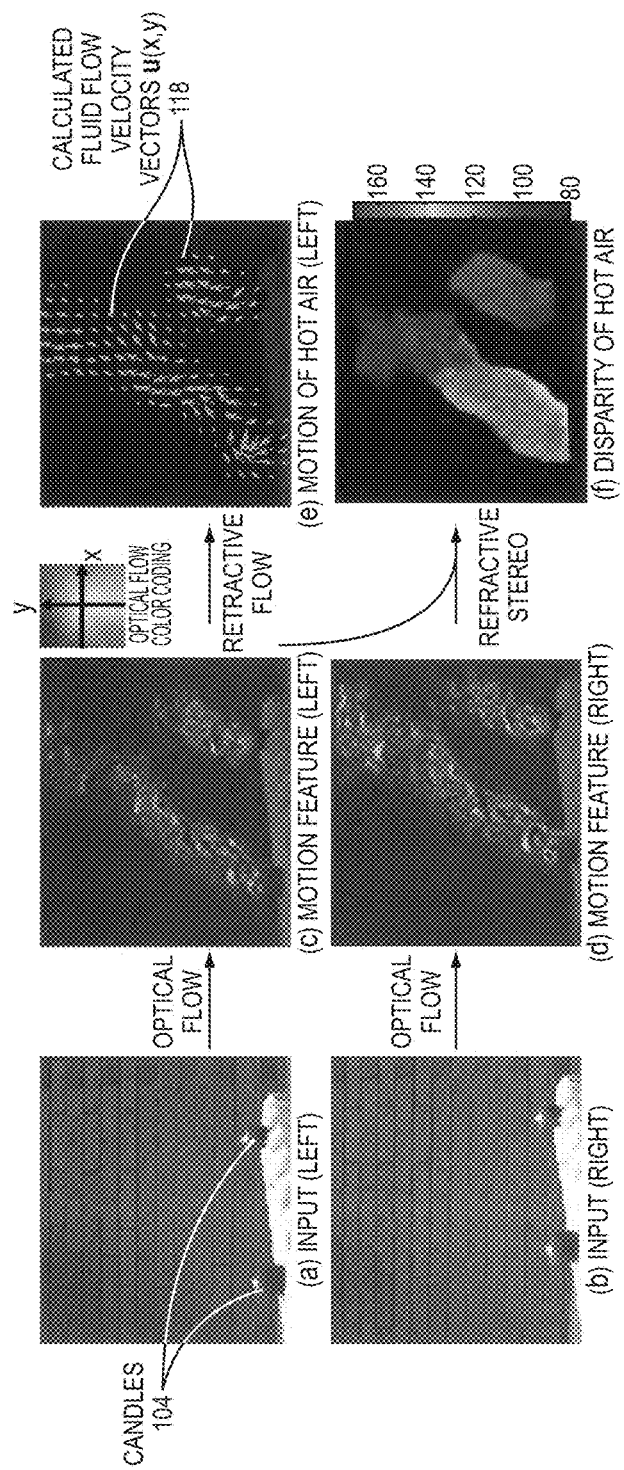
FIG. 1C(a)-(f) illustrates use of refractive flow according to embodiment methods and apparatus to obtain velocity and depth of a refractive field.

FIGS. 1C(a)-(f) illustrate application of refractive flow principles to obtain both fluid flow and depth of a refractive field. FIG. 1C(a) shows a video image obtained from a left-side video camera, and FIG. 1C(b) shows the same scene as in FIG. 1C(a), but from a right-side camera (not shown). Heat rising from two burning candles 104 causes small distortions of the background due to light rays refracting as they travel from the background to the cameras, passing through the hot air created by the candles. FIGS. 1C(c) and (d) show visualizations of the heat disturbances obtained by the existing synthetic schlieren imaging for the left- and right-side cameras, respectively. The synthetic schlieren images in FIGS. 1C(c) and (d) can be used to visualize the small disturbances and reveal the heat plumes, but schlieren imaging is unable to produce a measurement of the actual motion of the heat plumes. Under reasonable conditions described hereinafter, the refraction patterns (or observed motions) move coherently with a refracting fluid, allowing one to measure accurately both two-dimensional motion of the fluid flow and depth of the fluid flow.

FIG. 1C(e) shows calculated fluid flow velocity vectors 118 that can be obtained from a monocular video. In this case, the vectors 118 were obtained from images from the left-side camera. Further, as shown in FIG. 1C(f), the depth of the fluid flow can be obtained from a stereo image sequence. FIG. 1C(f) shows a disparity between the position of the plume obtained from the left-side camera and the position obtained from the right-side camera, and the disparity can be used to determine the depth of the refractive field.

Figure 1D:
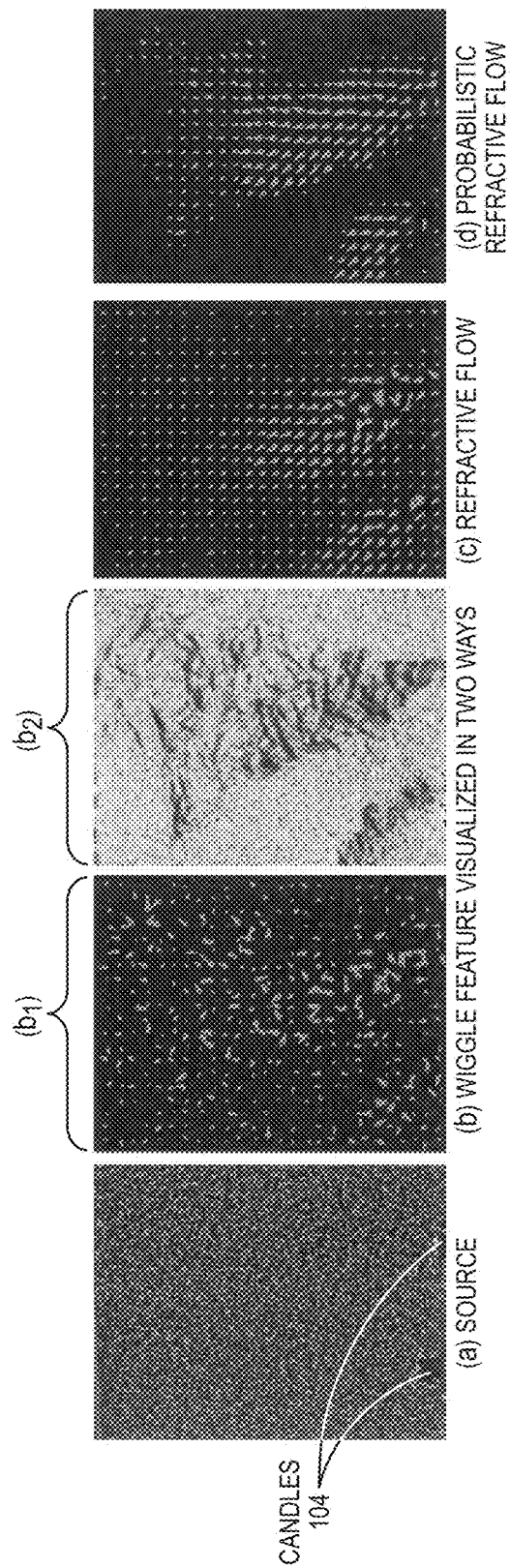
FIG. 1D(a)-(d) illustrates results of using uncertainty measurements to improve refractive flow measurements.

FIGS. 1D(a)-(d) illustrate how refractive flow measurements can be further improved by applying uncertainty principles described more fully hereinafter. FIG. 1D(a) shows a raw image of the candles 104, and FIG. 1D(b1) shows apparent motion velocity vectors obtained from applying optical flow. The apparent motion of a fluid that is visualized using optical flow can also be described as a "wiggle." FIG. 1D(b2) shows a schlieren image produced according to existing methods. FIG. 1D(c) illustrates apparent motion velocity vectors depicting the heat plumes rising from the candles 104, and the apparent motion velocity vectors are obtained using methods and devices according to embodiments of the invention. FIG. 1D(d) shows the apparent motion velocity vectors weighted, as described hereinafter more fully, to improve accuracy refractive flow results even further.

Figure 2:
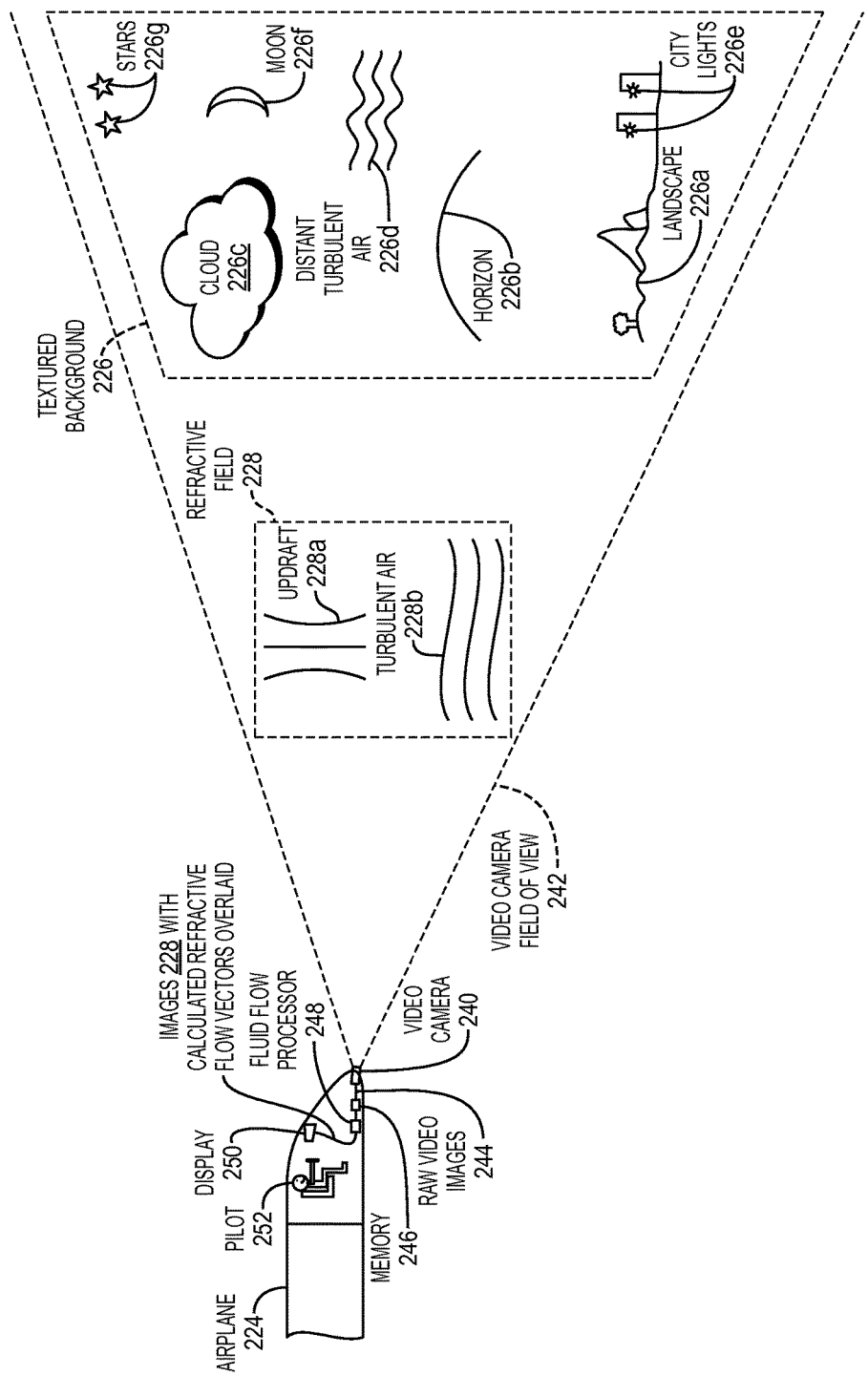
FIG. 2 illustrates use of an embodiment of the invention for an augmented reality display for an airplane pilot.

FIG. 2 illustrates an application of embodiments of the invention that includes real-time visualization of turbulence that can be encountered by an airplane 224. Disturbances such as the updraft 228a and the turbulent airflow to 228b create a refractive field 228 that could be encountered by the airplane 224. Light rays from a textured background 226 pass through, and are refracted by, the updraft 228a and turbulence 228b and are captured by a video camera 240 mounted on the airplane. Also within the field of view 242 of the video camera are various elements of the textured background 226, including a landscape 226a, horizon 226b, cloud 226c, and distant turbulent air 226d. Other elements of the textured background 226 can be useful at night, including city lights 226e, moon 226f, and stars 226g. Thus, FIG. 2 illustrates that a wide variety of different background elements can contribute to a textured background.

Even where turbulent air 228b in the refractive field 228 is being monitored and visualized in the foreground of the camera 240, for example, distant background turbulent air 226d is relatively constant in position compared with the foreground refractive field 228 and is useful as part of the textured background 226. The video camera 240 provides raw video images 244 to be stored in memory 246. A fluid flow processor 248 obtains the raw video images 244 and applies example methods described hereinafter to produce refractive flow measurements. The refractive flow measurements are output from the fluid flow processor 248 in the form of images 228 with calculated refractive flow vectors overlaid. The images 228 are presented in an display 250 to be seen by a pilot 252. The display 250 is updated continually to provide the pilot 252 with a real-time view of the refractive field 228, and thus the pilot 252 can see and attempt to avoid turbulence such as the updraft 228a and the turbulent air 228b.

It should be noted that in other embodiments, the display 250 can be an augmented reality display. For example, calculated fluid flow velocity vectors such as the vectors 118 in FIG. 1A can be projected onto the windows of the airplane 224 so that the vectors are seen in conjunction with the visual view of the atmosphere in which the refractive field 228 is located.

Figure 3A:
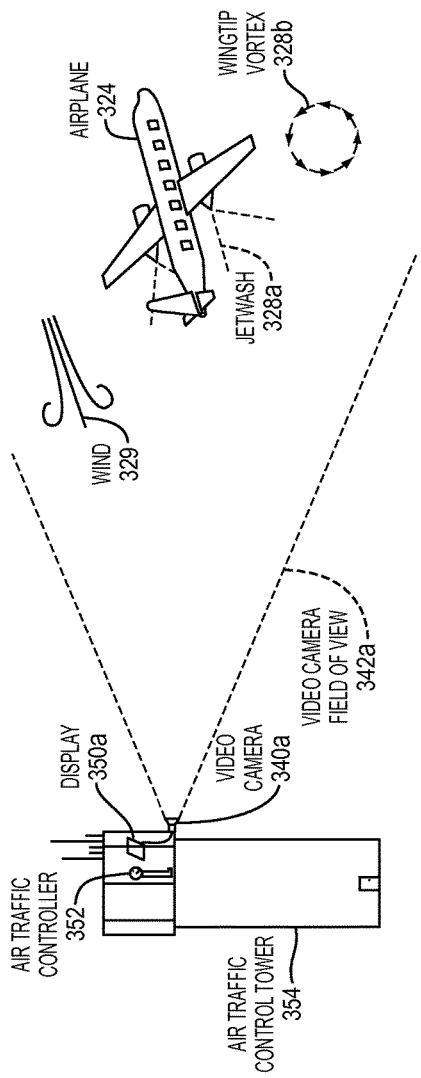
FIG. 3A illustrates use of an embodiment device in air traffic control.

FIG. 3A illustrates another setting in which embodiments of the invention can be used, namely in an air traffic control context. A video camera 340a is mounted on an air traffic control tower 354 and has a video camera field of view 342a. The field of view 342a includes areas in which airplanes, such as an airplane 324, take off and land. In other embodiments, the video camera 340a is mounted near runways or in other locations where it is useful to monitor airflow.

As understood in aviation, airplanes can produce wake turbulence, such as jetwash 328a and wingtip vortex 328b produced by the airplane 324. Images from the video camera 340a can be used to provide a display 350a for an air traffic controller 352. Moreover, the video camera 340 can see other air disturbances, such as wind 329. The embodiment of FIG. 3A thus illustrates how safety can be improved by using embodiments of the invention to monitor in real-time for both conditions created by airplanes and also natural weather conditions that can affect aviation. A real-time display, such as the display 350a, can be a much more useful to tool to identify these conditions than windsocks or the other weather monitoring instruments currently used because the display 350a can show a wide field of view and is not limited to point locations as windsocks are.

Figure 3B:
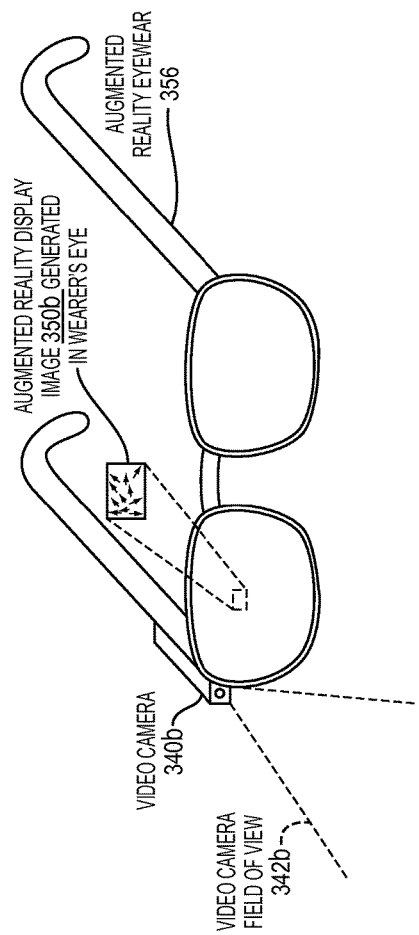
FIG. 3B illustrates use of an embodiment in a wearable device, namely augmented reality eyewear.

FIG. 3B illustrates how embodiments of the invention can be used in conjunction with augmented reality eyewear 356. A video camera 340b is mounted to the eyewear 356. The video camera 340b has a field of view 342b. An augmented reality display image 350b is generated in the wearer's eye by a projector (not shown). The display image 350b includes an image of the field of view 342b with a representation of fluid flow in the field overlaid on the image. The representation of the fluid flow can include calculated fluid flow velocity vectors, such as the vectors 138 shown in FIG. 1B. However, in other embodiments, fluid flow is represented in an augmented reality display image by color coding or some other means, for example.

Augmented reality eyewear, such as the eyewear 356 shown in FIG. 3B, can be useful in many applications in which it is useful to visualize fluid flow. Such situations can include hang gliding, for example, wherein a real-time knowledge of updrafts, downdrafts, and other air currents is important for safety and flight optimization. It should be noted that alternative embodiments of the invention can include virtual reality eyewear in which a virtual reality display image is generated in the wearer's eye. In the case of virtual reality, the eyewear would be opaque, and a completely artificial image would be generated in the wearer's eye. This is in contrast to the augmented reality eyewear 356 in FIG. 3B, in which the wearer can see outside the eyewear, and the view is simply augmented by an overlaid image 350b. According to embodiments of the invention, either fixed video cameras such as the camera 340a in FIG. 3A or mobile cameras with eyewear like the eyewear 356 in FIG. 3B can be used to visualize airflow or refractive flow in a variety of situations. Some of these situations are shown in FIGS. 3C-3E.

FIG. 3C illustrates a wind farm 358 in which wind turbines 360 are placed. Fixed or mobile video cameras can be used to obtain video images from the wind farm 358 to optimize output of wind turbines 360. For example, the wind turbines 360 can be positioned to maximize output based on refractive flow around each turbine.

FIG. 3D illustrates a city 362 in which there are various refractive elements that can be visualized by embodiment apparatuses. Such refractive sources include a steam source 364a, an exhaust source 364b, a heat and particulate matter source 364c, and wind 364d from a water body 366 near the city 362. A knowledge of such refractive sources can be used in a variety of ways in civil engineering and environmental monitoring applications, for example.

Figure 4A:
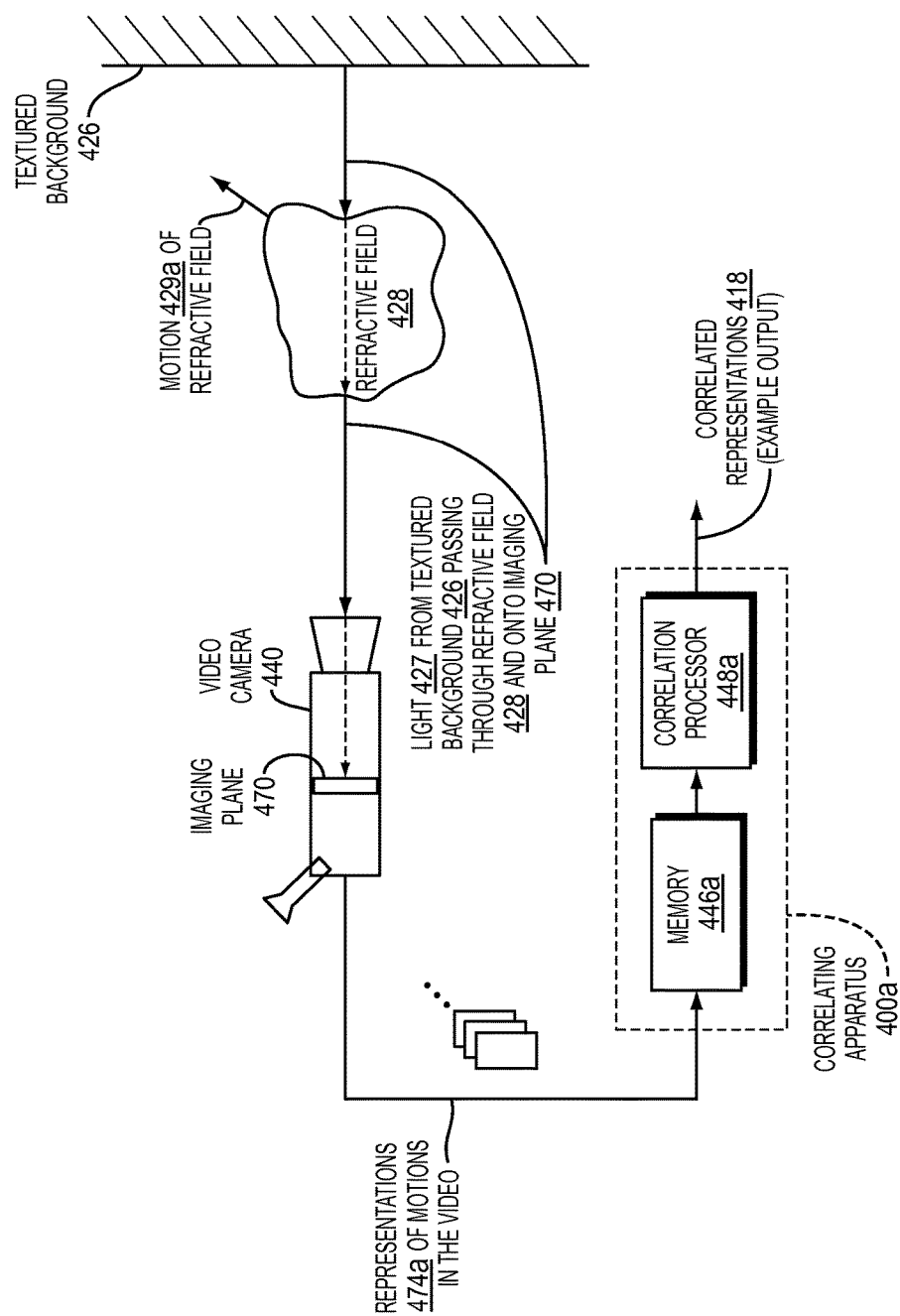
FIG. 4A is a block diagram illustrating an embodiment device.
Figure 4B:
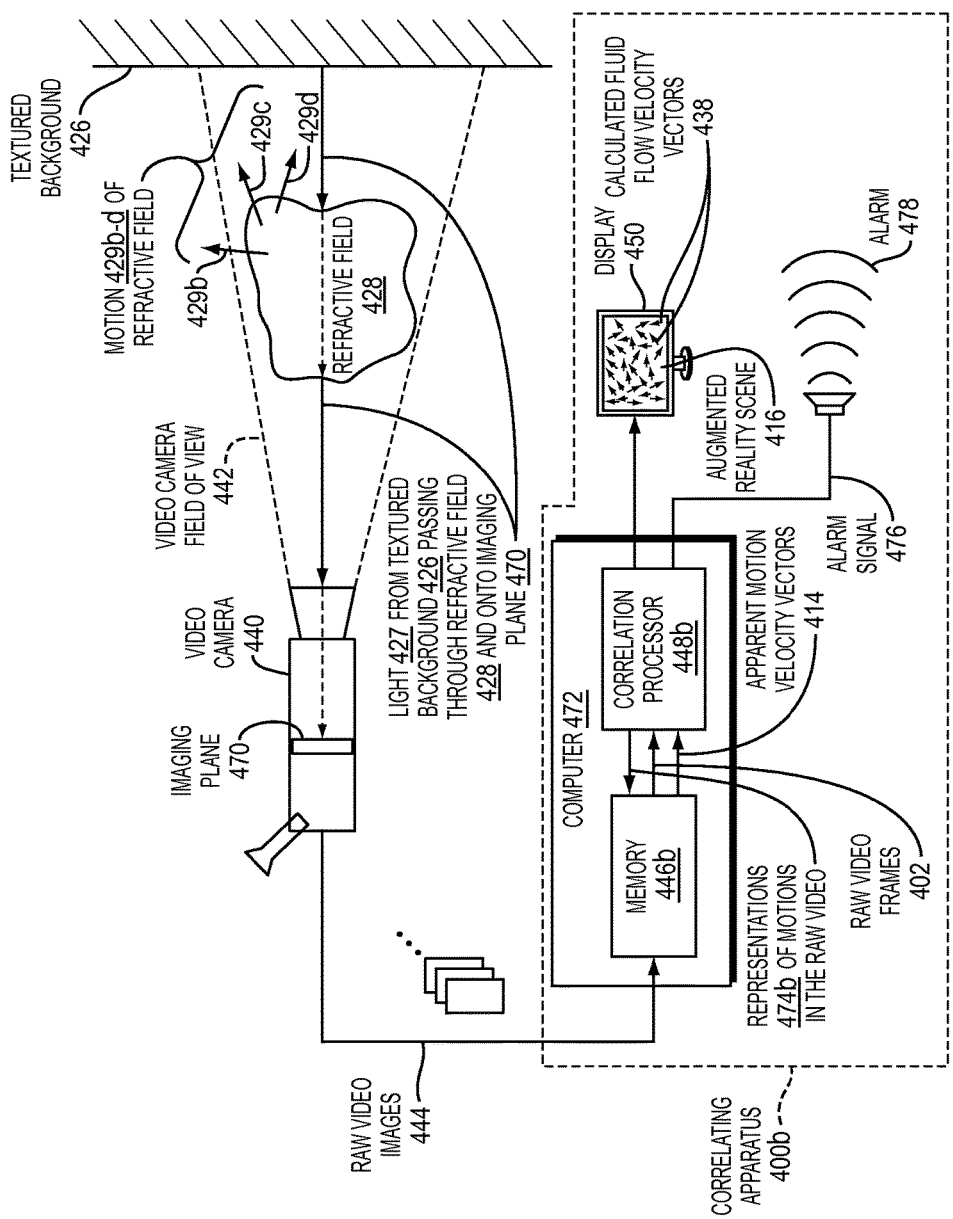
FIG. 4B is a block diagram illustrating an embodiment apparatus that includes a display and an alarm signal.
Figure 4C:
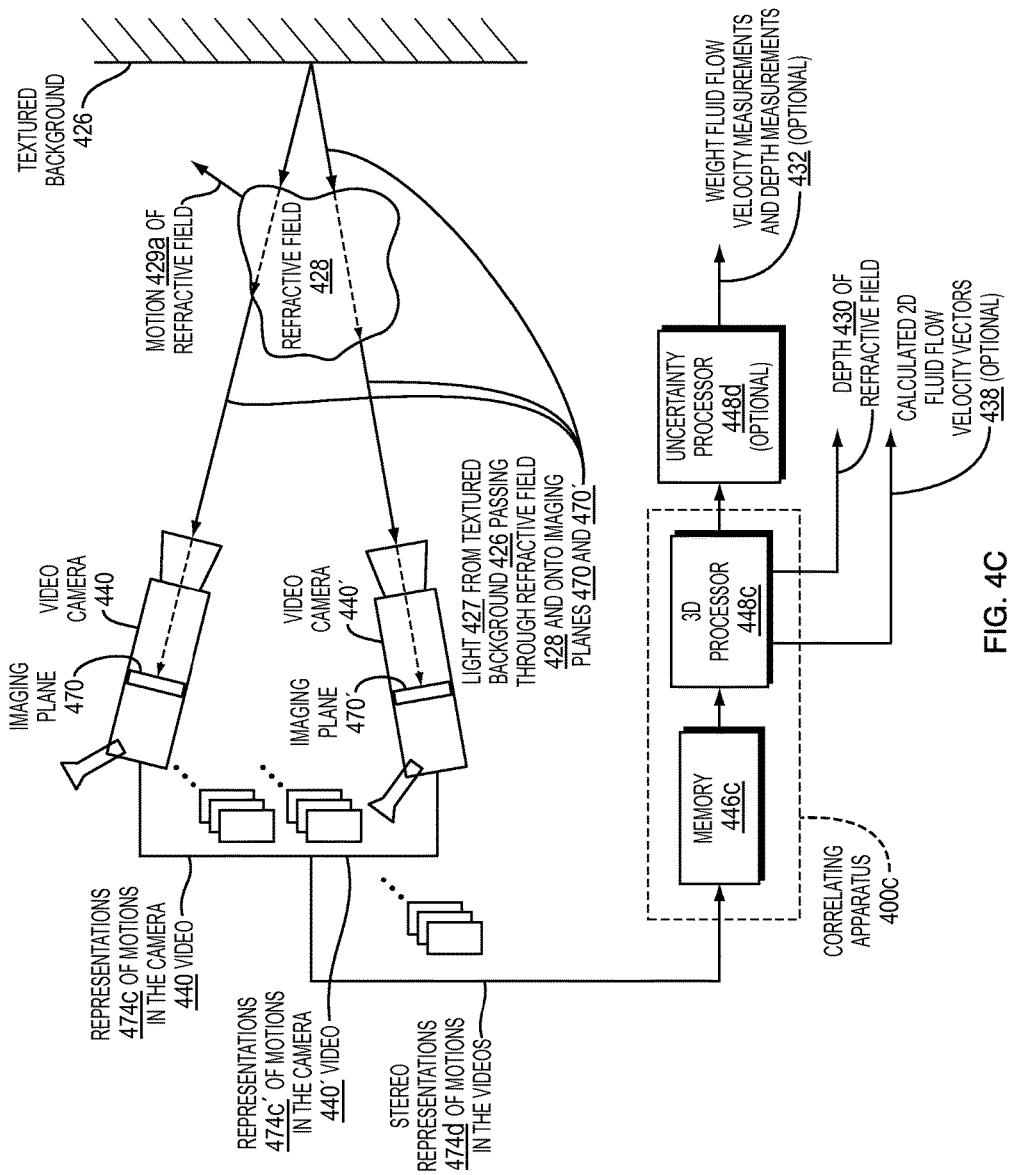
FIG. 4C is a block diagram illustrating an embodiment apparatus for determining fluid flow in three dimensions.

FIG. 4C is a block diagram illustrating a correlating apparatus 400c that can receive stereo representations 474d of motions captured by two video cameras and process the representations to obtain a depth 430 of the refractive field 428. The light 427 from the textured background 426 passes through the moving refractive field 428 and on to the imaging plane 470 of the video camera 440 and an additional imaging plane 470' of an additional video camera 440 private. The video camera 440 outputs representations 440c of motions in the captured video, and the video camera 440' outputs representations 474c' of the motions in the video from camera 440'. Both the representations 474c and 474c' are included in the stereo representations 474d of the motions in the videos. The stereo representations 470d are stored in a correlating apparatus 400c in a memory 446c. The correlating apparatus 400c also includes a 3-D (or depth) processor 448c, which obtains the stereo representations 474d from the memory 446c. The 3-D processor 448c is configured to correlate, over space, the stereo representations 474d in the two videos from frame to frame as a function of the motion 429a of the refractive field 428. Correlation of the stereo representations over space can include matching an apparent motion feature observed I one location of the imaging plane 470 with the same apparent motion feature observed in another location of the imaging plan 470'. The 3-D processor 448c also calculates, based on the correlated representations of the motions, a depth 430 of the refractive field. The 3-D processor 448c can optionally output depths for multiple points on the refractive field 428.

The 3-D processor 448c can optionally output calculated 2-D fluid flow velocity vectors 438. An optional uncertainty processor 448d calculates uncertainties of fluid flow velocity measurements and depth measurements according to embodiment methods and weights the measurements to output weighted fluid flow velocity measurements and depth measurements 432. While the uncertainty processor 448d is separate from the 3-D processor 448c in FIG. 4C, in other embodiments, a single processor performs correlation, depth, and uncertainty calculations. The uncertainty processor 448d can be configured to determine an uncertainty in the representations of the motion or in the depth of the refractive field using a variety of techniques described hereinafter. In particular, determining the uncertainty can include calculating a variance of the representations of motion and weighting the representations of motion as a function of the variance. Furthermore, the processor 448d can weight the representations of motion as a function of a degree of texturing of the textured background 426. In particular, in regions of greater texturing, the measurements of motion, or representations of motion, can be given greater weight. The processor 448d can apply an L2 norm to the representation of motion or calculate a covariance of the concatenation of a plurality of representations of motion, as described hereinafter. The determination of uncertainty can include waiting the representations 474c and 474c' as a function of a logarithm of a covariance of the representations of motion, and the covariance can be covariance of the representations 474c from video camera 440 and the additional representations 474c' from the video camera 440'. Furthermore, in other embodiments that include display such as the display 450 in FIG. 4B, the representations of motion can be displayed with the uncertainties in the representations by any means available, including, for example, shading and color coding the representations of motion.

FIG. 3E illustrates one example application for the petroleum industry. Namely, stationary or mobile cameras, such as those shown in FIGS. 3A-3B, can be used to monitor a pipeline 366 for a hydrocarbon leak 368. The pipeline 366 can be in a refinery or in a drilling location or other field or distribution location, for example. Furthermore, any volatile substance, droplet, bubble, or other refractive substance or object can be visualized where it differs in refractive properties from a surrounding fluid.

Figure 3F:
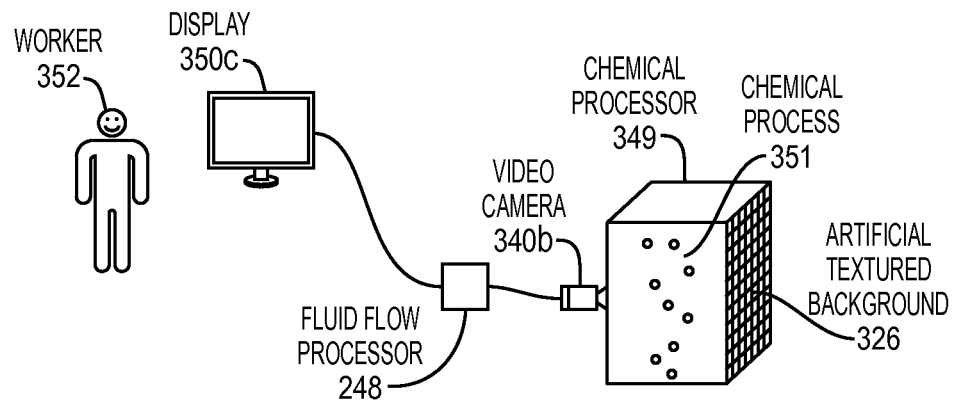
FIG. 3F illustrates an embodiment apparatus that can be used to monitor a chemical process.
Figure 3G:
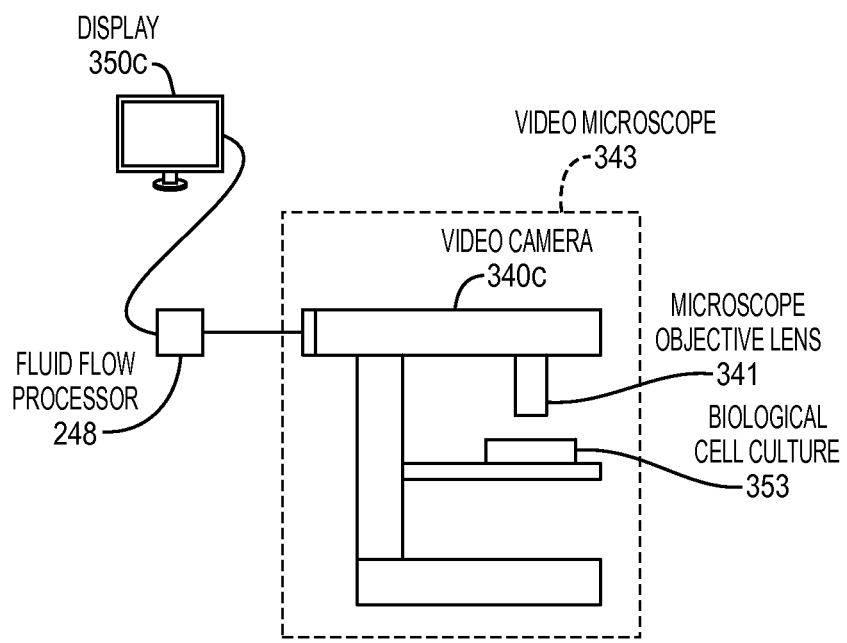
FIG. 3G illustrates and embodiment apparatus including a video microscope to monitor a biological cell culture.

FIGS. 3F and 3G illustrate that embodiments of the invention are not limited to outdoor or even to macroscopic refractive flow applications. FIG. 3F shows an embodiment of the invention used for monitoring a chemical process 351. The chemical process 351 occurs in a chemical processor structure 349 and is monitored by a video camera 340b configured to acquire video images of the chemical process 351 occurring in a fluid. Images of the chemical process 351 are sent to a fluid flow processor 248, which correlates representations of fluid motions in the chemical process 351 to obtain refractive flow measurements. The fluid flow processor 248 provides measurements of fluid flow in the chemical processor 349 and sends the measurements to a display 350c for viewing by a worker 352.

Refractive flow in the chemical processor 349 can result from bubbles rising, fluid heating, chemical reactions, or any other process that produces fluid currents within the processor 349. The video camera 340b is configured to capture light passing from an artificial textured background 326 through a fluid in the chemical processor 349 to an imaging plane (not shown) of the video camera 340b. In a controlled, artificial environment such as the chemical processor 349 in FIG. 3F, the artificial textured background 326 is preferable because it is provides superior texturing for visualizing refractive changes in the chemical processor 349 and is much easier to implement in a controlled setting than in the outdoors. However, in other embodiments, a natural textured background, such as the textured background 126a in FIG. 1B, can be used.

FIG. 3G illustrates an embodiment of the invention used to view fluid motion in a biological cell culture 353. FIG. 3G illustrates that embodiments of the invention can be used to visualize fluid flow even on a microscopic scale. The biological cell culture 353 is situated in the video microscope 343 and is viewed by a microscope objective lens 341, which is part of the video microscope 343. The microscope 343 also includes a video camera 340c that acquires images of the biological cell culture 353 viewed through the microscope objective lens 341 and captured at an imaging plane (not shown). A textured background (not shown) can include, for example, an artificial textured background such as the background 326 in FIG. 3F. The textured background can be scaled appropriately to have features comparable in size to the fluid motion in the biological cell culture 353. The video camera 340c outputs images of the cell culture 353, or representations of motions observed in the cell culture 353, to the fluid flow processor 248. The processor 248 correlates the representations as a function of motion of the refractive field in the cell culture 353. The correlated representations of the motions in the fluid are provided to a display 350c for viewing as calculated fluid flow vectors or in any other convenient form.

Lighting (not shown) in the video microscope 343 can be adjusted to optimize illumination of the artificial textured background. As understood in the art of microscopy, either forward lighting or backlighting can be used, as deemed appropriate. It should also be noted that, although not shown in FIGS. 3F and 3G, dual video cameras could be used in conjunction with the devices shown to obtain depth measurements of the refractive field in the chemical processor 349 or in the biological cell culture 353, as previously described in conjunction with FIGS. 1C(a)-(f), and as more fully described hereinafter.

FIG. 4A illustrates a correlating apparatus 400a including memory 446a and a correlation processor 448a. The memory 446a is configured to store representations 474a of motions in a video. The video is obtained from a video camera 440 with an imaging plane 470. The correlating apparatus 400a also includes a processor 448a that is configured to correlate, over time, the representations 474a of the motions in the video that are stored in the memory 446a. The processor 448a is configured to correlate the representations from frame to frame as a function of motion 429a of a refractive field 428 through which light 427 from a textured background 426 passes to the imaging plane 470 of the video camera 440. One way to perform this correlation is to apply the two-step refractive flow method described hereinafter. The correlation processor 448a is configured to output correlated representations 418. The correlated representations 418 are an optional example output, and the correlation processor 448a outputs other types of outputs in other embodiments. The correlated representations 418 can be output in the form of calculated fluid flow velocity vectors, such as the velocity vectors 118 in FIG. 1A, for example.

In FIG. 4A, the representations 474a are in the form of electronically stored apparent motion velocity vectors v(x,y) stored for various times for different video frames, such as the vectors 114 in FIG. 1A. However, in the other embodiments, the representations stored in the memory can be in any form that permits the processor to correlate, over time, the representations from frame to frame as a function of motion of the refractive field. These representations can include raw video images, for example. Either of those forms, and other forms of representations of the motions not shown here, can be suitable for correlation of the representations of the motions by the processor 448a with appropriate adjustments to correlation methods. In particular, a variety of electronic formats can be used to store the images showing the motions as understood in digital photography. Furthermore, as described earlier in conjunction with FIG. 1A, and as more fully described hereinafter, one convenient form of representations of motions in the video includes apparent motion velocity vectors such as the vectors 114 shown in FIG. 1A and obtained by initially applying optical flow. Moreover, while the memory 446a is shown as part of the correlating apparatus 400a in FIG. 4A, in other embodiments, the memory 446a is incorporated into the video camera 440.

The correlation processor 448a is configured to output correlated representations 418 of motions in the video. The correlated representations 418 are an example output from the processor and can be in the form of calculated fluid flow velocity vectors such as the vectors 118 in FIG. 1A, for example.

FIG. 4B is a block diagram illustrating an alternative correlating apparatus 400b. The apparatus 400b includes several optional features not included in the apparatus 400a in FIG. 4A. The memory 446b and processor for 448b in correlating apparatus 400b also are configured to operate somewhat differently from those in the apparatus 400a of FIG. 4A. The memory 446b in FIG. 4B for 446b and processor 448b are part of a computer 472. The memory 446b is configured to receive raw video images 444 from the video camera 440. Raw video frames 402 are transferred from the memory 446b to the processor 448b for performing initial optical flow calculations. The processor 448b then transfers representations 474b of motions in the raw video to the memory 446b in the form of apparent motion velocity vectors, such as those represented graphically in FIG. 1A as vectors 114. The processor 448b then obtains the apparent motion velocity vectors 114 from the memory 446b to apply optical flow calculations again to obtain refractive flow measurements. Refractive flow measurements are then output by the processor 448b to a display 450 in the form of calculated fluid flow velocity vectors 438 overlaid on an image of the scene to present an augmented reality scene 416.

The output from the processor 448b to the display 450 can be via a dedicated graphics card, for example. The processor 448b also outputs an alarm signal 476 to an alarm 478. The alarm signal 476 can be output to the alarm 478 via a driver (not shown), for example. The alarm 478 is activated by the alarm signal 476 when at least one calculated fluid flow velocity vector exceeds a given threshold in magnitude. Thus, as the alarm 478 feature demonstrates, displays such as the display 450 having augmented reality scenes are not the only way to use refractive flow measurements. The refractive flow measurements can be, optionally, further processed, displayed, or used in any way desired to visualize or calculate or represent fluid flow.

FIG. 4B also illustrates that the refractive field 428 generally includes many motions 429b, 429c, and 429d, for example, throughout the field. The motions 429b-d of the refractive field can arise from motion of one or more refractive objects in a fluid. Furthermore, the representations 474b of motions in the raw video can be representations of motions of the one or more refractive objects. Refractive objects can include smoke particles, molecules, regions of fluid differing in temperature from a surrounding region, regions of a fluid differing in pressure from surrounding region, droplets such as rain or condensation, bubbles such as bubbles in a liquid, exhaust, hydrocarbons, volatile substances, or any other refractive elements or substances in a fluid.

The 3-D processor 448c is configured to correlate, over space, the representations 474c and 474c' of motions from the two respective video cameras 440 and 440' with the respective imaging planes 470 and 470'. The 3-D processor 448c correlates the representations over space from frame to frame as a function of the motion 429a of the refractive field 428. The representations of motions 474c and 474c' are correlated over space when the location of a representation 474c observed at the imaging plane 470 is matched to a location on the imaging planes 470' where a corresponding representation 474c' is observed. Based on the correlated representations of the motions, a depth of the refractive field 428, or a point thereon, can be calculated, as described more fully hereinafter.

Figure 5A:
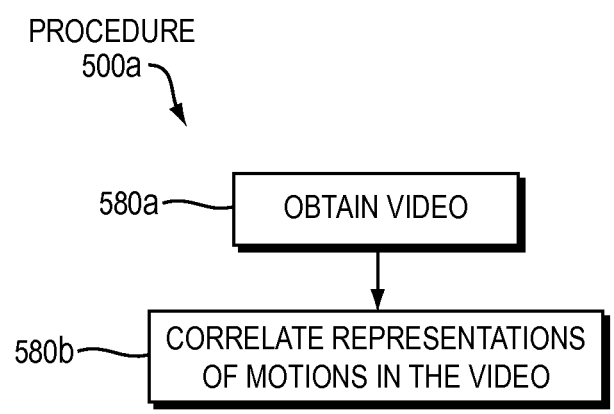
FIGS. 5A and 5B illustrate example procedures for correlating representations of motions in a video and using the correlated representations.

FIG. 5A illustrates a procedure 500a for obtaining fluid flow or refractive flow measurements. At 580a, video captured by a video camera with an imaging plane is obtained. At 580b, representations of motions in the video are correlated over time by a processor. The representations are correlated from frame to frame as a function of motion of a refractive field through which light from a textured background passes to the imaging plane of the video camera.

Figure 5B:
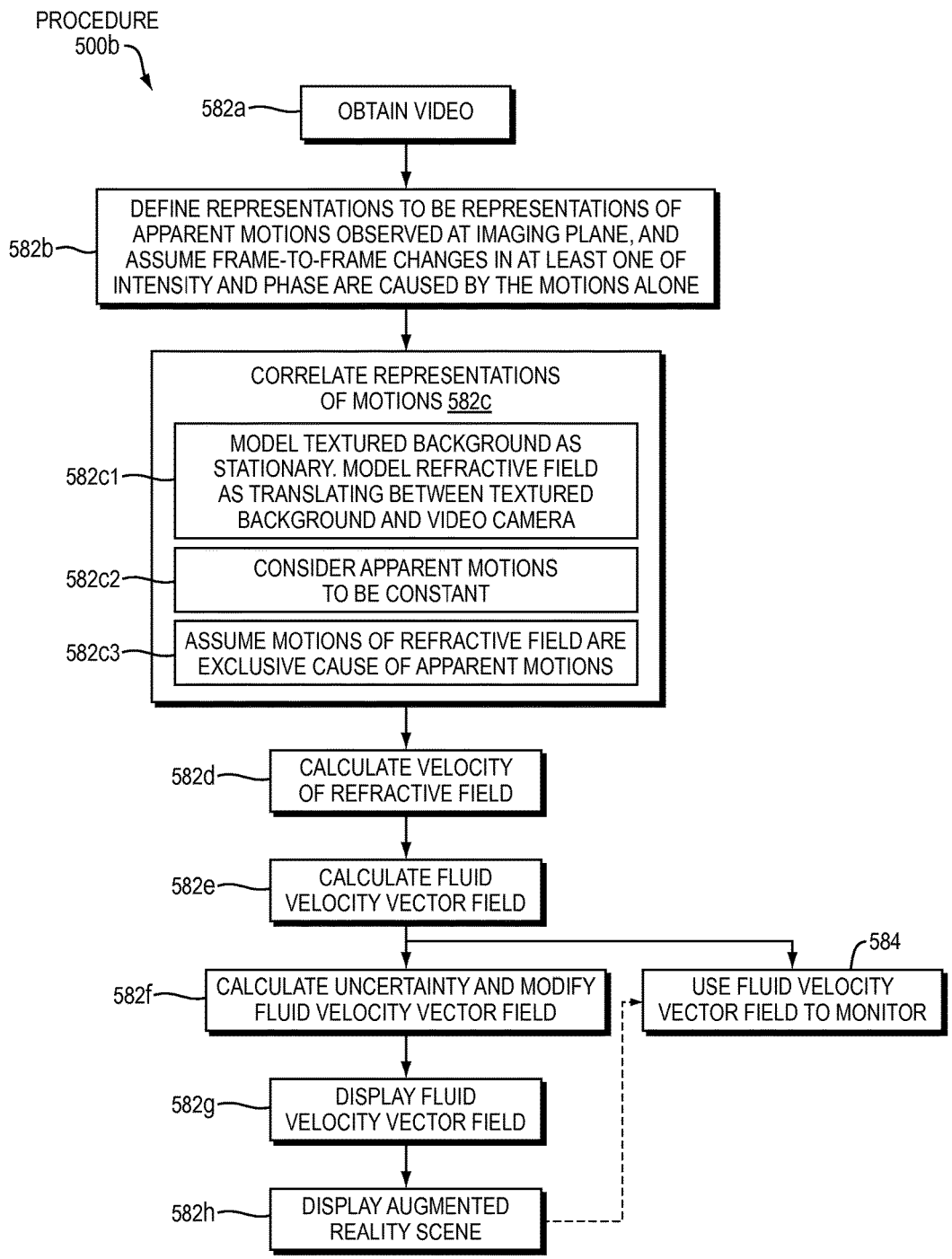

FIG. 5B illustrates an alternative procedure 500b for obtaining fluid flow measurements. Referring to FIG. 15B, at 582a, video captured by a video camera with an imaging plane is obtained. At 582b, representations of motions in the video obtained are defined to be representations of apparent motions observed at the imaging plane. The representations of the apparent motions are also determined by assuming that frame-to-frame changes in at least one of the intensity and phase are caused by the motions alone. At 582c, the representations of motions in the video are correlated over time from frame to frame as a function of motion of a refractive field through which light from a textured background passes.

In FIG. 5B, the correlation at 582c includes sub-elements 582c1, 582c2, and 582c3. At 582c1, the textured background is modeled as a stationary background, and the refractive field is modeled as translating between the textured background and the video camera. At 582c, the apparent motions are considered to be constant from one video frame to another video frame. At 582c3, actual motions of the refractive field are estimated based on the determined representations of the apparent motions by assuming that motions of the refractive field are an exclusive cause of the apparent motions.

Referring to FIG. 25B, at 582d, a velocity of the refractive field is calculated based upon the correlated representations of the motions. At 582e, a fluid velocity vector field is calculated, based on the correlating, as a function of position in the refractive field.

At 582g, a representation of the fluid velocity vector field is displayed. The display can be like the display 450 in FIG. 4B, for example. At 582h, the representation of the fluid velocity vector field is displayed in an arrangement with the real-life scene to present an augmented reality scene. The augmented reality scene can be in the form of video frames like the video frames 116 with the calculated fluid flow velocity vectors 118, as shown in FIG. 1A, for example. Alternatively, the augmented reality scene can be in the form of images such as the images 228 shown in FIG. 2 on the display 250 or such as the augmented reality display image 350b generated in the wearer's eye in FIG. 3B. Furthermore, in other embodiments, a virtual reality scene can be generated instead of an augmented reality scene.

Continuing to refer to FIG. 5B, at 584, the fluid velocity vector field is used to monitor for a hydrocarbon leak, a fluid turbulence, updraft, downdraft, or vortex. As shown in FIG. 5B, 584 can occur after calculating the fluid velocity vector field at 582e. However, as also shown by a dashed line, in other embodiments, the fluid velocity vector field is used for monitoring at 584 after displaying an augmented reality scene at 582h. This difference in when the fluid velocity vector field is used for monitoring relates to whether or not an augmented reality scene is used for display purposes. As explained in conjunction with FIG. 4B, the fluid velocity vector field may be used in an augmented reality display such as the display 450, or the fluid velocity vector field may be used only for further calculations or monitoring performed by a computer, for example.

One example of monitoring performed by a computer is found in FIG. 4B, wherein the processor 448b analyzes the fluid velocity vector field to determine whether any velocity exceeds a given threshold. If the threshold is exceeded, the processor sends an alarm signal. In this way, use of the fluid velocity vector field can be by means of a computer and/or further calculations and need not be used to present an augmented reality or virtual reality scene for viewing by a person.

Figure 5C:
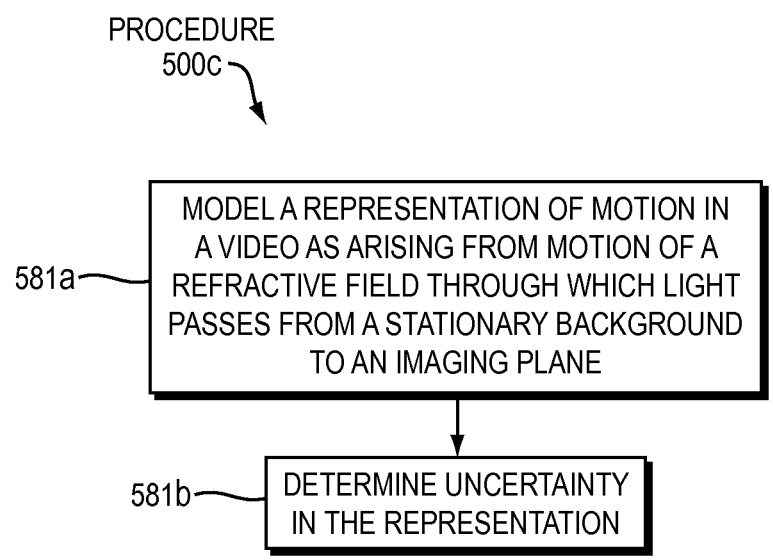
FIG. 5C illustrates an example procedure for determining uncertainty in correlated representations of motion.

FIG. 5C illustrates a procedure 500c for determining an uncertainty in refractive flow measurements. At 581a, a representation of motion in a video captured by video camera is modeled as arising from motion of a refractive field through which light passes from a stationary background to an imaging plane of the video camera. At 581b, uncertainty in the representation of the motion is determined by a processor.

Determining the uncertainty in the representation can include calculating variance of the representation of motion and weighting the representation of motion as a function of the variance. In some embodiments, determining the uncertainty includes weighting the representation of motion as a function of the degree of texturing of the stationary background. For example, where the background is heavily textured, the wiggles or representations of motion observed by a video camera can be determined with greater certainty. On the other hand, where a background is only lightly textured, the representations of motion can be determined with less certainty, and these representations can be downweighted in determining refractive flow. Furthermore, where the representations of motion or refractive flow measurements determined there from are displayed on a monitor or other image, uncertainty in the representations can also be displayed through, for example, shading or color coding the representations of motion. As described more fully hereinafter, determining the uncertainty can include applying an L2 norm to the representation of motion, calculating a covariance of the concatenation of a plurality of representations of motion, or weighting the representation of motion as a function of the logarithm of a covariance of the representation of motion in the video captured by the video camera and an additional representation of the motion in an additional video captured by an additional video camera, such as the video cameras 440 and 440' in FIG. 4C.

Refractive Fluid Flow

An example goal of refractive flow is to recover the projected 2D velocity, u(x, y, t), of a refractive fluid such as hot air or gas, from an observed image sequence, I(x, y, t). Before proceeding by analogy to a differential analysis of refraction flow, a differential analysis of standard optical flow for solid objects is first presented hereinafter.

Differential Analysis of Optical Flow

Figure 6A:
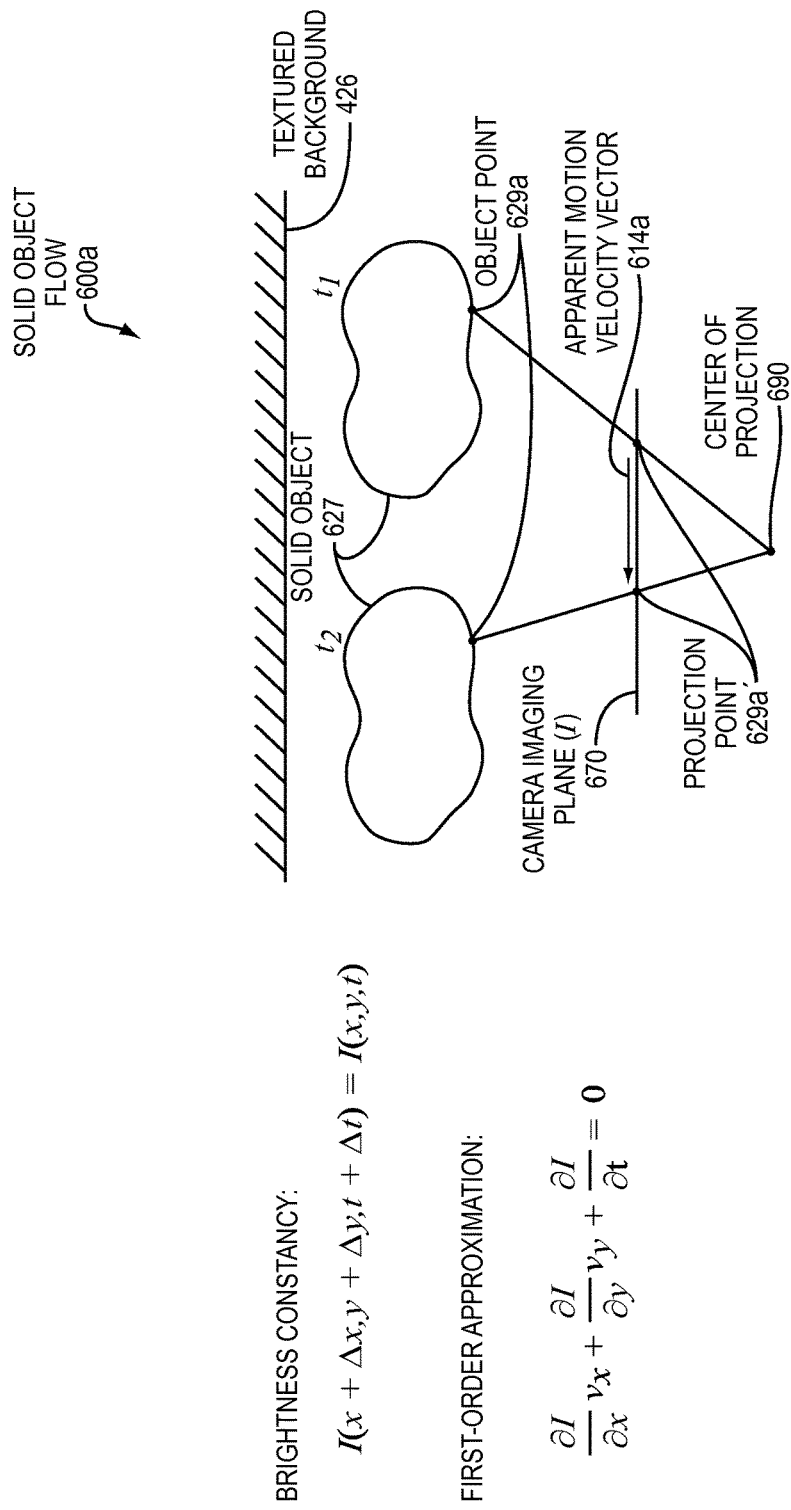
FIG. 6A illustrates use of a brightness constancy principle in the prior art to track motion of a solid object.

FIG. 6A includes a diagram 600a illustrating application of a brightness constancy assumption to flow of a solid object 627 according to known methods. As seen in FIG. 6A, the solid object 627 moves with time from one position at time $t_1$ to another position at time $t_2$. An object point 629a on the solid object 627 also moves between times $t_1$ and $t_2$. The object point 629a is imaged to a projection point 629a' on the camera imaging plane 670 at times $t_1$ and $t_2$, with a center of projection 690 for the video camera. An apparent motion velocity vector 614a represents the motion of the object point 629a between times $t_1$ and $t_2$ as observed at the camera imaging plane 670. Because light rays do not penetrate the solid object 627, the textured background 426, shown for purposes of comparison with other figures, is not relevant in FIG. 6A.

Under the "brightness constancy" assumption, any changes in pixel intensities, I, are assumed to be caused by a translation with velocity $v=(v_x, v_y)$ over spatial horizontal or vertical positions, x and y, of the image intensities, where $v_x$ and $v_y$ are the x and y components of the velocity, respectively. That is, $$I(x,y,t)=I(x+\Delta x,y+\Delta y,t+\Delta t) \quad (1)$$

where ($\Delta x$, $\Delta y$) denotes the displacement of the point (x, y) at time $t+\Delta t$.

Applying a first order Taylor approximation to Equation 1 gives $$\frac{\partial I}{\partial x}v_x + \frac{\partial I}{\partial y}v_y + \frac{\partial I}{\partial t} = 0. \quad (2)$$

The velocity v can then be solved for by using optical flow methods such as the Lucas-Kanade or Horn-schunck methods known in the art.

Extension to Refraction Flow

Figure 6B:
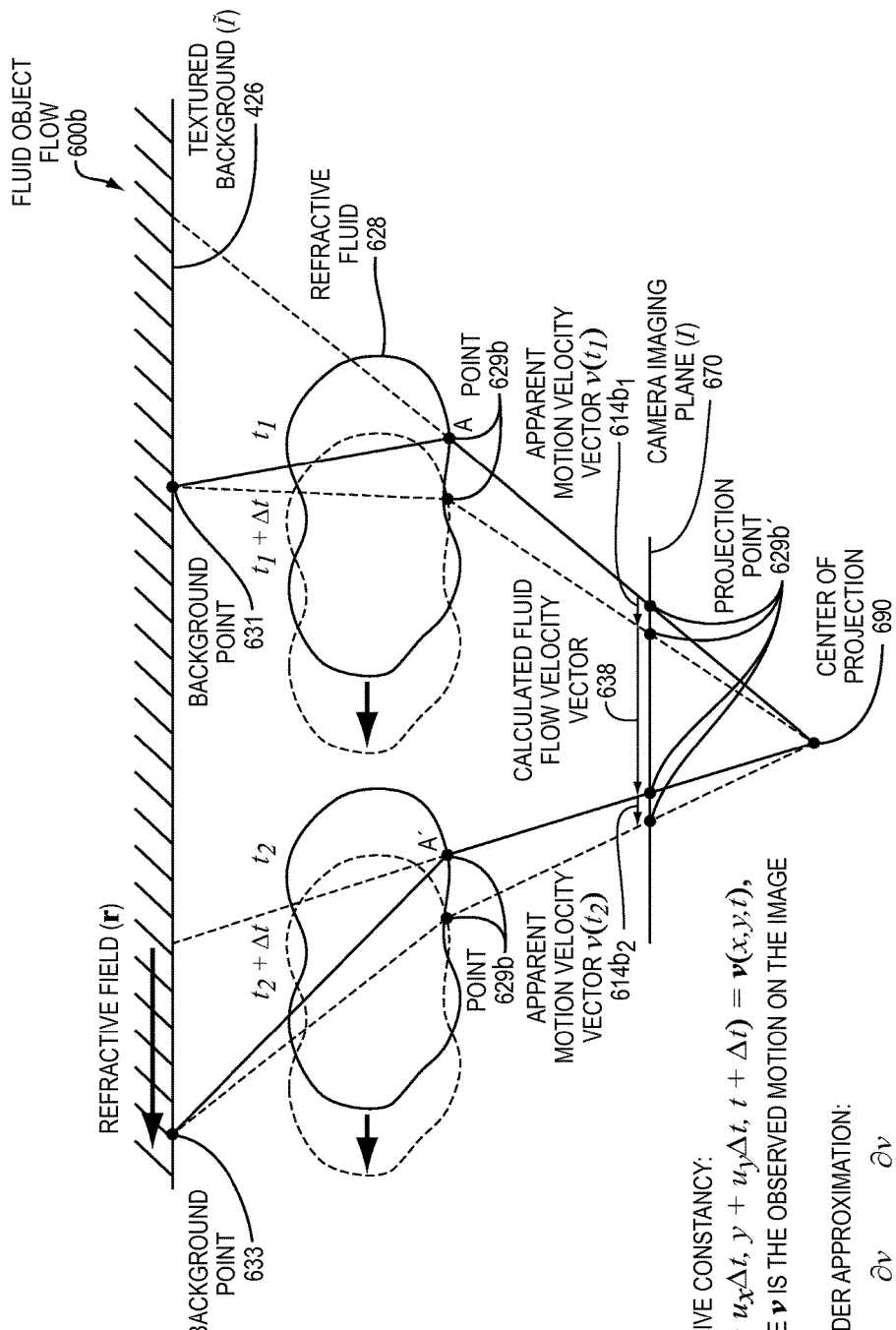
FIG. 6B illustrates use of a refractive constancy principle according to embodiments of the invention to obtain fluid object flow or refractive flow.

Brightness constancy, however, does not hold for refractive fluids, as rays passing through a point on the fluid intersect the background at different points at different times, as shown in FIG. 6B.

FIG. 6B includes a diagram 600b illustrating application of a refractive constancy principle to flow of a refractive fluid 628 according to embodiments of the invention. In contrast to a solid object 627, the refractive fluid 628 can transmit at least some light from the textured background 426 through the refractive fluid 628 to the camera imaging plane 670. Thus, as described previously, motion observed at the camera imaging plane 670 arises both from motion of the refractive fluid 628 and from refraction of light at the refractive fluid 628 during its motion. The textured background 426 can be a natural background, for example, in that the textured background 426 can include natural or everyday objects and need not be a special laboratory setup. For example, the textured background 426 can be like the textured backgrounds 126A-C in FIG. 1B or light the textured background 226 in FIG. 2, for example.

The refractive fluid 628 is shown at two time instants $t_1$ and $t_2$. At time $t_1$, the fluid 628 refracts light rays, effectively moving background points 631 and 633 on the background to different positions, or projection points 629b', on the camera imaging plane 670. At time $t_1$, for example, the background point 631 appears at a different position on the imaging plane 670 than it does it at the time $t_1+\Delta t$. Similarly, at time $t_2$, the background point 633 appears at a different point on the camera imaging plane 670 than it does at time $t_2+\Delta t$.

In FIG. 6B, the observed motions on the imaging plane are referred to as apparent motion velocity vectors 614b1 and 614b2. In general, the direction of the observed motions on the imaging plane due to the refraction can be arbitrary. In the case illustrated in FIG. 6B, the observed motions or apparent motions 614b1 and 614b2 are in the same direction as the actual or calculated fluid flow, as shown by a calculated fluid flow velocity vector 638. However, the direction of the observed motions on the imaging plane due to refraction can be consistent over time as the fluid changes its position. According to embodiments of the invention, the observed motions can be tracked over time to recover a projected 2-D motion of the refractive fluid 628.

To obtain a calculated fluid flow such as the calculated fluid flow velocity vector 638 shown in FIG. 6B, the observed scene can be modeled as composed of a stationary background, $\tilde{I}(x, y)$ (such as the textured background 426), and a refractive field, r(x, y, t), (such as the refractive fluid 628) translating in between the scene and the camera:

$$I(x+r_x(x,y,t),y+r_y(x,y,t),t)=\tilde{I}(x,y), \quad (3)$$

The refractive field, r, indicates the spatial offset in the imaging plane, caused by light rays bending due to index of refraction gradients between the scene and the camera. For example, such refractive gradients can be due to bubbles of hot air traveling with the velocity of moving air.

The inventors have recognized that it can be further assumed that the moving refraction gradients imaged to a point (x, y) have a single velocity, u(x, y). In other words, the apparent motions v(x,y) are considered to be constant from one video frame to another frame. Under these conditions, namely when motions, or translation, of the refractive field is assumed to be the exclusive cause of local image velocity changes, this "refraction constancy" can be exploited to explain the observed local velocity changes by the translation, u(x, y), of an assumed refractive field. In other words, the frame-to-frame motions in a video are considered to be a function of motion of the refractive field r(x,y,t). This yields a "refraction constancy" equation:

$$r(x,y,t)=r(x+u_x\Delta t, y+u_y\Delta t, t+\Delta t). \quad (4)$$

It is shown hereinafter in the section labeled "Proof of v=∂r/∂t" that, under the condition of Equation 4, the temporal derivatives of the refraction field correspond directly to the observed motion in the sequence. That is, v=∂r/∂t. Additionally taking the partial derivative of Equation 4 with respect to t, the observed motion can be written as $$v(x,y,t)=v(x+u_x\Delta t, y+u_y\Delta t, t+\Delta t). \quad (5)$$

Since, the v(x,y,t) constitute frame-to-frame representations of motions in a video, and since r(x,y,t) in Equation 4 is expressed as a function of motion u(x,y) of the refractive field, an implementation of Equation 5 by a processor is, thus, one way to correlate, over time, representations of motions in the video from frame to frame as a function of motion of the refractive field.

It should be pointed out that the "correlating" performed in embodiments of the present invention should be distinguished from the "correlating" performed in signal processing. Further, while one way of correlating representations of motions in the video as a function of motion of a refractive field is described above, the embodiments can include other ways of correlating. For example, another way to correlate representations of motions in the video is to first filter the representations of motion by complex oriented filters, and then extract the phase change of filters response between frames.

Assuming v varies smoothly and that Δt is small, a first order Taylor expansion can again be used to approximate Equation 5 as $$\frac{\partial v}{\partial x}u_x + \frac{\partial v}{\partial y}u_y + \frac{\partial v}{\partial t} = 0. \quad (6)$$

Equation 6 can be used to develop and implement a two-step approach for solving for the fluid motion, u. The observed or apparent motions, v, can first be calculated using the standard optical flow equation (Equation 2). Then, optical flow can be applied again, this time on the estimated motions, to get the actual motion of the refractive fluid. Solving for u(x,y) for at least one point (x,y), therefore, constitutes calculating a velocity of the refractive field based upon the correlated representations v(x,y,t) of the observed motions. Further, solving for several points can be carried out to produce a fluid velocity vector field. Since the observed motions correspond directly to changes in the refraction field, and following the refraction constancy assumption, computing the optical flow of the optical flow will yield actual or refractive fluid flow.

Refractive Flow Versus Optical Flow

Applying standard optical flow to an observed video sequence will not yield the correct motions of the refractive fluid. To illustrate this, the refraction constancy equation (Equation 4) may be considered again. Approximating Equation 4 by the first order using a Taylor expansion yields $$\frac{\partial r}{\partial x}v_x + \frac{\partial r}{\partial y}v_y + \frac{\partial r}{\partial t} = 0. \quad (7)$$

Note that the optical flow result is equal to the change of refraction field, v=∂r/∂t. Then from Equation 7, it can be observed that:

$$v = Du, \quad (8)$$

$$\text{where } D = \begin{bmatrix} \frac{\partial r_x}{\partial x} & \frac{\partial r_x}{\partial y} \\ \frac{\partial r_y}{\partial x} & \frac{\partial r_y}{\partial y} \end{bmatrix},$$

$$u = \begin{bmatrix} u_x \\ u_y \end{bmatrix},$$

where the matrix D in Equation 8 can be called the refraction Jacobian matrix (or the refraction matrix).

Equation 8 shows that the observed motions, v, are in fact the product of the refractive matrix D and the fluid flow v. This means that, under the image formation model, the observed motions are caused by both refraction gradients and fluid motion. For example, the same observed motion can result from large refraction changes and small fluid motion, or large fluid motion and small refraction changes.

The form of Equation 8 provides a few insights on refractive flow. First, it can be noted that refractive flow can be obtained where flow is not completely stable laminar flow, in which case the refraction matrix, D, would be zero. This is analogous to the aperture problem known for optical flow. Second, it can be noted that optical flow (brightness constancy) alone will not be able to disambiguate fluid motion from refraction changes. In fact, with the refraction constancy assumption (Equation 4), these two types of motions are implicitly disambiguated by attributing lower-spatial-frequency motion to fluid motion, and higher-spacial-frequency motion to refraction gradients.

Refractive Flow Based on Phase Analysis

It is useful to note that the approach to fluid flow described above provides no restriction on how to actually compute optical flow in a refractive flow methods. For example, good results can be obtained when using local phase changes for initially characterizing the observed or apparent motions, instead of using optical flow on the intensities. It should be noted that motions due to refraction can be small, even on the order of one pixel per frame or less.

Phase changes can be obtained by building a two-orientation, two-level complex steerable pyramid and applying DC-balanced temporal high pass filter to the phases (e.g., convolving with [1, −1]). This allows one to avoid having to use an undistorted reference frame, as done in conventional background-oriented schlieren techniques. This decomposition provides both amplitude and phase, which, respectively, capture the texture strength and motion.

A temporal Gaussian blur can be applied to an input video sequence, and an amplitude-weighted spatial blur can be applied to the phases. These variations improve the signal-to-noise ratio of the signal significantly, allowing extraction of very subtle signals due to refraction. To deal with small camera motions, the amplitude weighted mean of the phase over a single orientation, scale, and frame can be subtracted from a phase signal.

After extracting and processing the phases, feature vectors can be created by combining the phase from 19 frames in time (the frame of interest itself, 9 frames before, and 9 frames after the frame of interest). Using a wider temporal extent to compute features can provide a richer representation and can improve results relative to only tracking features between single frames.

Notably, even ordinary consumer cameras can be used to acquire video images in embodiments of the invention. For example, the candle, wind, and landing sequences shown in FIGS. 1A and 1B were taken with ordinary consumer DSLR cameras. However, higher performance cameras may also be used in some applications for improved results. For example, a high-speed camera was used to film the takeoff video images shown in FIG. 1B. Specifically, the takeoff sequence was filmed at 500 frames per second.

Where a background is sufficiently textured, even small differences in air temperatures can be visualized with devices implementing the example methods described above. For example, in a separate test video sequence (not shown), the flow of heated air around a person was visualized. Since the temperature difference between a person and the ambient air can be very small, the amount of refraction produced by heated air around person can likewise be small, resulting in deflections as small as 100th of a pixel. In this test case, the signal-to-noise ratio was increased by having the person running up and down 20 flights of stairs and then acquiring the video of the person in a 4° C. refrigerator using a well-textured background consisting of a multiscale wavelet noise pattern.

However, embodiments of the invention can also visualize scenes without an artificial background like the multiscale wavelet noise pattern previously mentioned. In the wind, take off, and landing videos, for example, atmospheric wind patterns are visualized using the forest and buildings as the textured background to visualize changes in index of refraction at a given position in the scene.

It should be noted that measuring wind speed is an important factor in weather forecasting. Embodiments of the invention allow for denser sampling of wind speed than the point measurements given by an anemometer. Thus, embodiments of the invention can improve the accuracy and range of forecasts.

Proof of v=∂r/∂t

If the background is considered to be stationary, then the brightness constancy assumption can be applied to fluid objects:

$$I(x+r_x(x,y,t), y+r_y(x,y,t), t) = I(x+r_x(x,y,t+\Delta t), y+r_y(x,y,t+\Delta t), t+\Delta t). \quad (9)$$

A first order approximation to the right hand side of Equation 9 yields $$I(x + r_x(x, y, t), y + r_y(x, y, t), t) = I(x + r_x(x, y, t), y + r_y(x, y, t), t + \Delta t) + \frac{\partial I}{\partial x}\frac{\partial r_x}{\partial t}\Delta t + \frac{\partial I}{\partial x}\frac{\partial r_y}{\partial t}\Delta t,$$

which yields $$\frac{\partial I}{\partial x}\frac{\partial r_x}{\partial t} + \frac{\partial I}{\partial y}\frac{\partial r_y}{\partial t} + \frac{\partial I}{\partial t} = 0. \quad (10)$$

Therefore, the observed image motion v is equal to the temporal gradient of the refractive field ∂r/∂t.

Conditions for 2D Refraction Constancy

In this section, it is shown when the 2D refraction constancy assumption holds. In general, a fluid element is described by a spatiotemporally-varying index of refraction n(x, y, z, t). The 2D refraction field is determined by the gradient of the index of refraction. It can be assumed that index of refraction does not change when a fluid element moves (3D refraction constancy). That is, $$n(x,y,z,t)=n(x+\Delta x,y+\Delta y,z+\Delta z,t+\Delta t).$$

Suppose a ray traveling in this field is defined as $f(s)=(f_x(s), f_y(s), f_z(s))$. When the index of refraction is close to 1 (as in air), the following equation holds $$\frac{d\vec{d}}{ds} = \nabla n, \quad (11)$$

where $$d = \frac{d\vec{r}}{ds} \bigg/ \left|\frac{d\vec{r}}{ds}\right|$$

is a unit vector describing the local ray direction.

If the distance between the air flow and background is much larger than the thickness of the air, then the refractive field is approximately equal to $$r(x,y,t)=-hP\int_{f(s):C_{x,y,t}} \nabla n(f(s),t)ds \quad (12)$$

where h is the distance between the air and the background, P is a projection matrix that projects the motion in 3D to 2D, and $C_{x, y, t}$ is the ray that hits the point (x, y) on the image plane at time t. It can be assumed that all the points on the ray path $C_{x, y, t}$ share the same motion.

When the motion of air is small, the ray hits (x, y) on the image plane at time t passes through the similar region as the ray hits $(x+v_x\Delta t, y+v_y\Delta t)$ on the image plane at time t+Δt. Therefore, $$\int_{f(s):C_{x,y,t}} \nabla n(f(s), t)ds = \int_{f(s):C_{x+v_x\Delta t, y+v_y\Delta t, t+\Delta t}} \nabla n(f(s), t + \Delta t)ds,$$

Furthermore, if it is further assumed that over a short time, the motion along z-dimension is negligible compared with the distance between the air and the background, then h in Equation 12 can be considered to be constant. Therefore, $r(x, y, t)=r(x+v_x\Delta t, y+v_y\Delta t, t+\Delta t)$. This proves the 2D refraction constancy.

Calculations have been derived for tracking the movement of refractive fluids in a single video and for recovering a 3-D position of points on a fluid surface from stereo video sequences. Both of these calculations are based on the refractive constancy assumption previously described, namely that intensity variations over time (the wiggles or apparent motions) can be explained by the motion of a constant refraction field.

Calculations for Three-Dimensional (3D) Measurements and Uncertainty

Figure 6C:
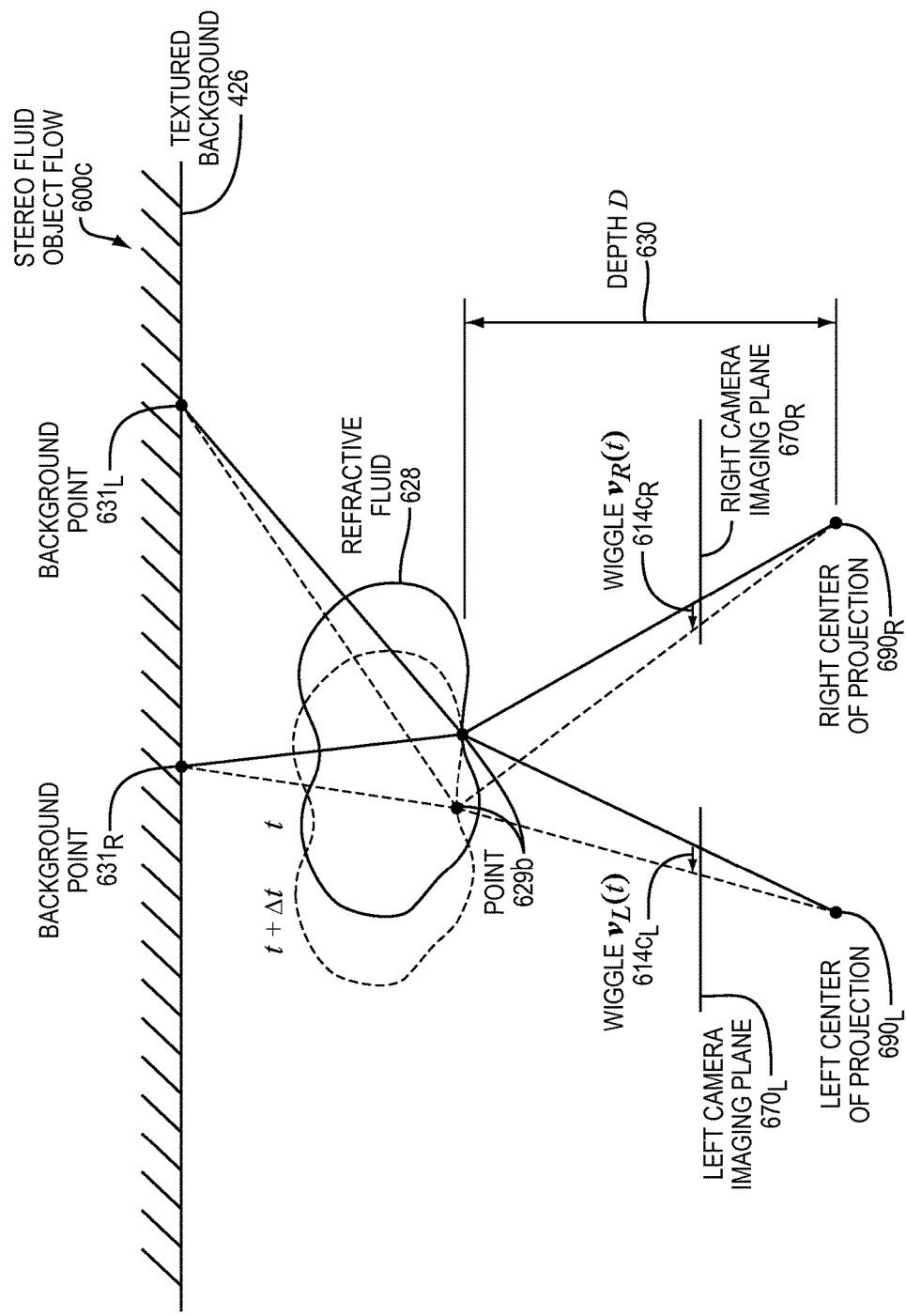
FIG. 6C illustrates use of a refractive constancy principle according to embodiments of the invention to obtain depth of a refractive field as well as refractive flow.

FIG. 6C includes a diagram 600c illustrating measurement of a depth 630D from stereo video images in accordance with embodiments of the invention. Similar to FIG. 6B, apparent motion velocity vectors at a camera imaging plane are viewed as the refractive fluid moves from a time t to time t+Δt plus Delta T such that apparent motion velocity vectors, or wiggles, can be observed in two different imaging planes of two different cameras and can be matched or correlated over space to recover the depth of the fluid.

FIG. 6C is similar to FIG. 6B in that apparent motion velocity vectors, or wiggles, are viewed using light rays passing from a textured background 426 through a refractive fluid 628 that is in motion. However, FIG. 6C includes two cameras, a left camera with a left camera imaging plane $670_L$ and a right camera with the right camera imaging plane $670_R$. Left camera has a left center of projection $690_L$ and observes wiggles $614_L$. The right camera has a right center of projection $690_R$ and sees wiggles $614_R$ as the refractive fluid 628 moves during the small time Δt.

The wiggle features in an input video are computed using optical flow, and then using those features to estimate the motion and depth of the fluid, by matching them across frames and viewpoints.

The distortion of the background caused by the refraction is typically very small (in the order of 0.1 pixel) and therefore often hard to detect. The motion features have to be extracted carefully to overcome inherent noise in the video, and to properly deal with regions in the background that are not sufficiently textured regions, in which the extracted motions are less reliable. To address these issues, probabilistic refractive flow and stereo methods that maintain estimates of the uncertainty in the optical flow, the refractive flow, and the fluid depth are presented hereinafter.

The proposed methods have several advantages over existing methods: (1) a simple apparatus that can be used outdoors or indoors, (2) they can be used to visualize and measure air flow and 3D location directly from regular videos, and (3) they maintain estimates of uncertainty.

Gradients in the refractive index of air can show up as minute motions in videos. Theorems are stated hereinafter that establish the relation between those observed motions in one or more cameras and the motion and depth of refractive objects in a visual scene.

In the monocular case previously shown in FIG. 6B, a video camera observes a static background 426 through a single refractive fluid layer 628. When the fluid is moving, the same point on the background may trace back to different points on the image plane due to refraction changes (see the dashed and solid lines in FIG. 6B. Such observed motions can be called "refraction wiggles", or "wiggles" for short. When a fluid object with a non-uniform surface moves a small amount from time $t_1$ (solid shape) to time $t_1+\Delta t$ (dashed shape), the light ray passing through a point B on the background changes due to the refraction (from solid line to dashed line), producing a visual shift on the image plane (short arrow), which is the wiggle and can be represented by the apparent motion velocity vectors $614b_1$ and $614b_2$. At time $t_2$, the fluid moves to another location, and the projection of the movement of the fluid onto the image plane (long black arrow) can be recovered. The direction of the wiggle and the direction of the refractive flow can be different, as the wiggle direction also depends on the shape of the refractive element.

Because the input in FIG. 6B is only a monocular video sequence for one camera imaging plane 670, the method can at most recover a 2D projection of the motion of the refractive fluid 628.

The task of refractive flow is to recover the projected 2D fluid motion from an input video sequence.

Similarly, in the stereo case, two cameras with image planes $690_L$ and $690_R$ image static background 426 through a refractive fluid layer 628. If a standard stereo matching directly on the input stereo sequence is applied, the method will recover the depth of (solid) points in the background. In contrast, in refractive stereo it is desirable to recover the depth of the (transparent) fluid layer, stereo fusing on the motion wiggles rather than the image intensities.

Methods herein after presented for both refractive flow and refractive stereo are based on this observation: for a point on the fluid object, its refraction wiggle is constant over a short time and across different views. To state this observation more formally, first the wiggle that a point on a fluid layer generates can be defined.

Definition 1 (Refraction wiggle): Let A be a point on the refractive fluid layer, B be the intersection between the background and the light ray passing through A and the center of projection at time t, and Δt be a short time interval. Then the wiggle of A from time t to t+Δt is the shift of the projection of B on the image plane during this time.

Then this definition leads to the following two refractive constancy theorems.

Theorem 1 (Refractive flow constancy): Suppose the fluid object does not change its shape and index of refraction during a short during [t1, t2]. Then for any point on the fluid object, its wiggle v(t1) at t1 equals to its wiggle v(t2) at t2.

Theorem 2 (Refractive stereo constancy): Suppose there are at least two (n≥2) cameras imaging a refractive fluid object, and they are all parallel and close to each other. Then at any time t, and for any point on the fluid object, the corresponding wiggle in all the cameras is the same.

Proofs of Theorems 1 and 2 are included hereinafter in the Supplementary Material section.

FIGS. 6B and 6C illustrate these two theorems, respectively. In the monocular case shown in FIG. 6B, when the fluid moves from time $t_1$ to $t_1+\Delta t_1$ and from time $t_2$ to $t_2+\Delta t_2$, it generates wiggles shown by the respective arrows, and according to Theorem 1, these two wiggles are equal. Similarly, in the stereo case in FIG. 6C, when the fluid moves from t to t+Δt, it generates a wiggle on the left and right views (shown by the respective arrows $614C_L$ and $614C_R$), and according to Theorem 2, these two wiggles are also equal.

The practical implication of these theorems is that matching the projection of a point on the fluid object across frames (over time) or viewpoints (over space) can be done by matching the observed wiggle features. That is, while the position of intensity texture features is unrelated to the fluid 3D structures, the position of wiggle features respect features on the fluid surface and can serve as an input feature for optical flow and stereo matching methods. Hereinafter, derivations of optical flow and stereo methods for tracking and localizing refractive fluids are presented.

The goal of fluid motion estimation is to recover the projected 2D velocity, u(x, y, t), of a refractive fluid object from an observed image sequence, I(x, y, t). As described in the previous section, the wiggle features v(x, y, t), not the image intensities I(x, y, t), move with the refractive object. Thus, estimating the fluid's motion can be done using two steps: 1) computing the wiggle features v(x, y, t) from an input image sequence I(x, y, t), and 2) estimating the fluid motion u(x, y, t) from the wiggle features v(x, y, t). Each of these steps is described in turn below.

Computing Wiggle Features

The brightness constancy assumption in optical flow is that any changes in pixel intensities, I, are assumed to be caused by a translation with motion $v=(v_x, v_y)$ over spatial horizontal or vertical positions, x and y, of the image intensities, where $v_x$ and $v_y$ are the x and y components of the velocity, respectively. That is, $$I(x,y,t+dt)=I(x+v_x dt, y+v_y dt, t).$$

Based on this brightness constancy equation, a traditional way to calculate the motion vector v is to minimize the following optical flow equation:

$$\tilde{v} = \operatorname*{argmin}_u \sum_x \alpha_1 \left\| \frac{\partial I}{\partial x} v_x + \frac{\partial I}{\partial y} v_y + \frac{\partial I}{\partial t} \right\|^2 + \alpha_2 \left( \left\| \frac{\partial v}{\partial x} \right\|^2 + \left\| \frac{\partial v}{\partial y} \right\|^2 \right)$$

where $\alpha_1$ and $\alpha_2$ are weights for the data and smoothness terms, respectively.

Estimating Fluid Motion

Let $u_x$ and $u_y$ be the x and y components of the fluid's velocity. The refractive constancy equation for a single view sequence is then:

$$v(x,y,t+\Delta t) = v(x+u_x \Delta t, y+u_y \Delta t, t)$$

Notice that refractive constancy has the exact same form as brightness constancy (Equation 1), except that the features are the wiggles v rather than the image intensities I. Applying optical flow to the wiggle features v (rather than to the intensities, I), will yield the fluid motion u. The fluid motion u by minimizing the (fluid flow) following equation:

$$\tilde{u} = \operatorname*{argmin}_u \sum_x \beta_1 \left\| \frac{\partial \tilde{v}}{\partial x} u_x + \frac{\partial \tilde{v}}{\partial y} u_y + \frac{\partial \tilde{v}}{\partial t} \right\|^2 + \beta_2 \left( \left\| \frac{\partial u}{\partial x} \right\|^2 + \left\| \frac{\partial u}{\partial y} \right\|^2 \right)$$

This is similar to the Horn-Shark optical flow formulation and similar to optical flow methods, and a multi-scale iterative method can be used to solve it.

FIGS. 1D(a)-(d) demonstrate a result of this refractive flow method, when applied to a video of a burning candle (candle). First, wiggle features (b1) and (b2) are extracted from the input video (a). Since wiggle features move coherently with the air flow, the method correctly estimates the motion of the thermal plume rising from the candle. Notice that the observed motions (wiggles) have arbitrary directions, yet the estimated refractive flow (c) is much more coherent.

Such processing is very sensitive to noise, however, as can be seen in FIG. 1D($b_1$) and ($b_2$). The problem can be even more severe for less textured backgrounds. This motivates the probabilistic formulation below.

Both the refractive flow, and its uncertainty can be estimated. Consider a background that is smooth in the x direction and textured in the y direction. Due to the aperture problem known in the art of optical flow, the flow in the x direction may be dominated by noise, while the optical flow in the y direction can be clean. Knowing the uncertainty in the flow allows uncertain estimates to be down-weighted, increasing the robustness of the method.

To find the variance of the optical flow, the following equation can be formulated as a posterior distribution:

$$P(v \mid I) = \exp\left(-\sum_x \alpha_1 \left\| \frac{\partial I}{\partial x} v_x + \frac{\partial I}{\partial y} v_y + \frac{\partial I}{\partial t} \right\|^2 + \alpha_2 \left\| \frac{\partial v}{\partial x} \right\|^2 + \alpha_2 \left\| \frac{\partial v}{\partial y} \right\|^2 \right)$$

Here, P(v|I) is a Gaussian distribution, and the mean of P(v|I) equals to the solution of the original optical flow equation for v given above. With this formulation, the variance of the optical flow (the wiggle features) can also be calculated. See the supplementary material for the detailed calculation. Let v and $\Sigma v$ be the mean and covariance, respectively, of the wiggle features computed from Equation ____. The L2-norm for regularization is used, in contrast to robust penalty functions such as L1 norm traditionally used by optical flow methods, since fluid objects, especially hot air or gas, do not have the clear and sharp boundaries of solid objects.

Then, with the variance of the wiggle features, we can reweight the fluid flow equation can be reweighted as follows:

$$\tilde{u} = \operatorname*{argmin}_u \sum_x \beta_1 \left\| \frac{\partial \tilde{v}}{\partial x} u_x + \frac{\partial \tilde{v}}{\partial y} u_y + \frac{\partial \tilde{v}}{\partial t} \right\|^2_{\Sigma_v} + \beta_2 \left( \left\| \frac{\partial u}{\partial x} \right\|^2 + \left\| \frac{\partial u}{\partial y} \right\|^2 \right) + \beta_3 \|u\|^2$$

Here the squared Mahalanobis distance is denoted as $\|x\|_\Sigma^2 = x^T \Sigma^{-1} x$. In this formulation, the data term is reweighted by the variance of the optical flow to robustly estimate the fluid motion: wiggle features with less certainty, such as motions measured in regions of low-contrast, or of flat or 1-dimensional structure, will have low weight in fluid flow equation. To increase the robustness, the magnitude of u can also be to avoid estimating spurious large flows. The inclusion of the above uncertainty information leads to more accurate estimation of the fluid motion, as shown in FIG. 1D(d).

In practice, calculating the covariance matrix precisely for each pixel is computationally intractable, as the marginal probability distribution for each optical flow vector needs to be computed. To avoid this calculation, we concatenate all the optical flow vectors can be concatenated into a single vector and its covariance can be computed. See the supplementary material given hereinafter for the details. Also, the fluid flow equation still has a quadratic form, so the posterior distribution of the fluid flow u can be modelled as a Gaussian distribution, and its variance can be computed. This variance serves as a confidence measure in the estimated fluid motion.

The goal of fluid depth estimation is to recover the depth D(x, y) of a refractive fluid object from a stereo sequence $I_L(x, y, t)$ and $I_R(x, y, t)$ (FIG. 2(b)). According to the refractive stereo constancy theorem (Theorem 2), the depth of the fluid object can be found by stereo-matching the refraction wiggles from the left and right views. So first the method discussed in the previous section can be used to calculate the mean and variance of the optical flows in the left and right views, $v_L \sim N(\tilde{v}_L, \Sigma_L)$ and $v_R \sim N(\tilde{v}_R, \Sigma_R)$, respectively.

A discrete Markov Random Field (MRF), common for stereo matching can then be used to regularize the depth estimates. Formally, let $x_L$ and $x_R$ be the projection of a point on the fluid object onto the left and right image plane, respectively, and define ECCV-14 submission ID 1550 9 disparity as $d = x_L - x_R$. The disparity map can be solved first by minimizing the following objective function:

$$\tilde{d} = \min_d \sum_{x,y} f(v_R(x, y), v_L(x + d(x, y), y)) + \alpha \left( \left\| \frac{\partial d}{\partial x} \right\|^2 + \left\| \frac{\partial d}{\partial y} \right\|^2 \right)$$

where f($v_R$, $v_L$) is the data term based on the observed wiggles $v_R$ and $v_L$, and the last two terms regularize the disparity field. The inventors have found that using the $L_2$ norm for regularization generates better results overall, better explaining the fuzzy boundaries of fluid refractive objects.

As with the refractive flow, the data term can be weighted by the variance of the optical flow to make the depth estimation robust to points in a scene where the extracted wiggles are not as reliable. To achieve this, the data term, f($v_R$, $v_L$), can be defined as the log of the covariance between the two optical flows from the left and right views:

$$f(\bar{v}_R, \bar{v}_L) = \log\mathrm{cov}(v_R, v_L) = \frac{1}{2}\log|\Sigma_L + \Sigma_R| + \frac{1}{2}\|\bar{v}_R - \bar{v}_L\|^2_{\Sigma_L + \Sigma_R}$$

where $\|\bar{v}_R - \bar{v}_L\|^2_{\Sigma_L + \Sigma_R} = (\bar{v}_R - \bar{v}_L)^T(\Sigma_L + \Sigma_R)^{-1}(\bar{v}_R - \bar{v}_L)$. This data term will assign a higher penalty to inconsistencies in the wiggle matching where the wiggles are more reliable, and a lower penalty where the wiggles are less reliable (typically where the background is less textured and the optical flow is noisy). The choice of the log of the covariance as the data term is not arbitrary, and it is the log of the conditional marginal distribution of $v_L$ and $v_R$, given that $v_L$ and $v_R$ match. See the supplementary material given hereinafter for a detailed derivation.

With calibrated cameras, the depth map, D(x, y), can be computed from the disparity map, d(x, y).

Qualitative Results

Figure 7:
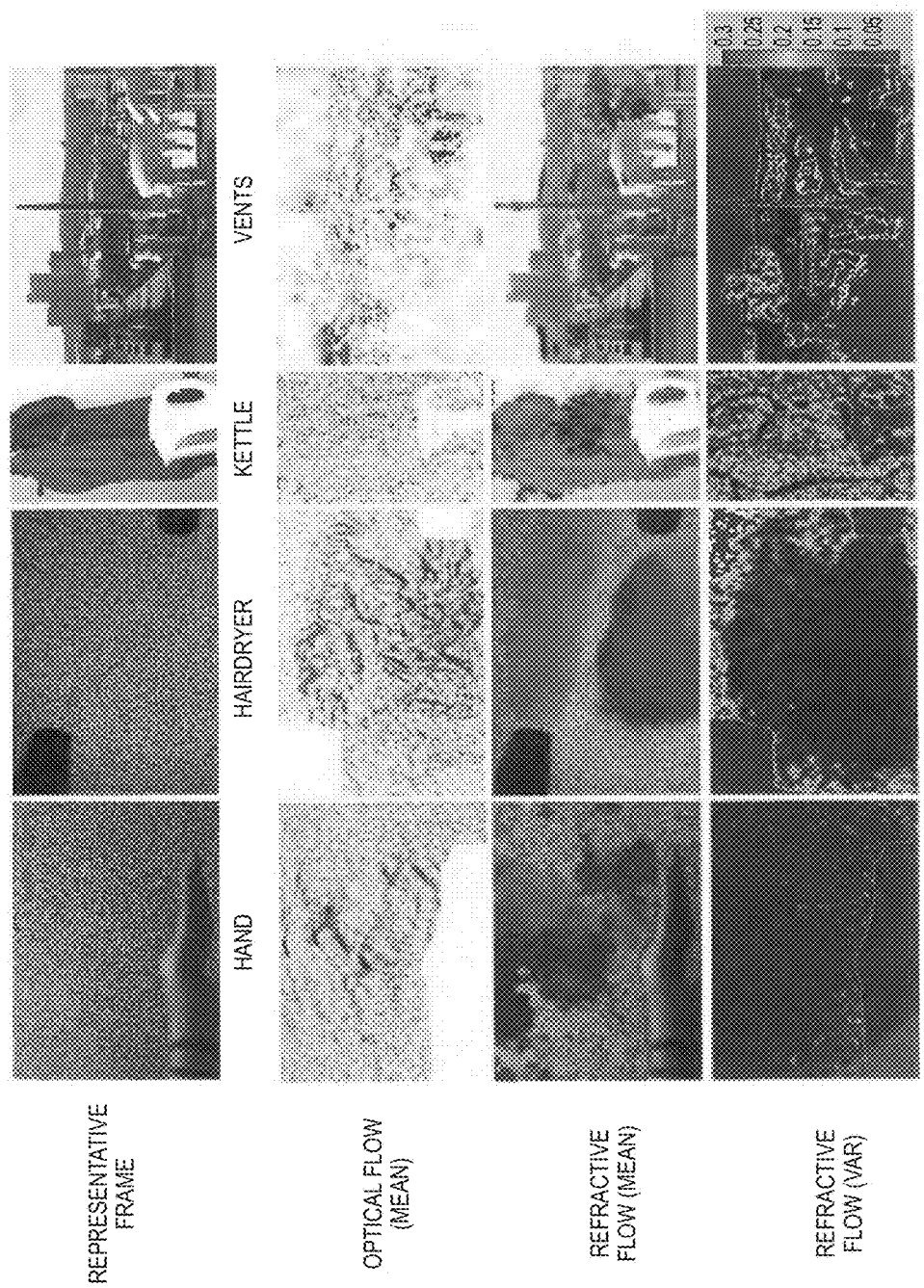
FIG. 7 illustrates the results of refractive flow analysis using a single camera to view various scenes.

FIG. 7 shows several results of refractive flow analysis using a single camera.

FIG. 7 contains several examples of measuring and localizing hot air radiating from several heat sources, such as people, fans, and heating vents. Refer to the supplementary materials given hereinafter for the full sequences and results.

All the videos were recorded in raw format to avoid compression artifacts. To deal with small camera motions or background motions, the mean flow for each frame can be subtracted from the optical flow result. For each sequence captured, a temporal Gaussian blur was first applied to the input sequence in order to increase the SNR. The high-speed videos were captured using a high-speed camera. For some of the indoor high-speed sequences, a temporal band-stop filter was used to remove intensity variations from the light intensities modulated by AC power.

The refractive flow method was first tested in controlled settings using a textured background. In the "hand" column, a video at 30 frames per second (fps) was taken of a person's hand right after holding a cup of hot water.

Heat radiating upward from the hand was recovered. In hairdryer, a 1000 fps high-speed video of two hairdryers placed opposite to each other (the two dark shapes in the top left and bottom right are the front ends of the hairdryers) was taken, and two opposite streams of hot air flows were detected.

The "kettle" and "vents" columns demonstrate the result on more natural backgrounds. In "vents" (700 fps), the background is very challenging for traditional background oriented schlieren (BOS) methods, as some parts of the background are very smooth or contain edges in one direction, such as the sky, the top of the dome, and the boundary of the buildings or chimneys. BOS methods rely on the motion calculated from input videos, similar to the wiggle features shown in the second row of FIG. 7, which is very noisy due to the insufficiently textured background. In contrast, the fluid flow (third row of FIG. 7) clear shows several flows of hot air coming out from heating vents. By modeling the variance of wiggles in the probabilistic refractive flow, most of the noise in the motion is suppressed. The bottom (fourth) row of FIG. 7 shows the variance of the estimated refractive flow (the square root of the determinant of the covariance matrix for each pixel).

Quantitative Evaluation

FIGS. 8A-8E illustrate quantitative evaluation of the refractive flow method disclosed herein. Simulated fluid density (FIG. 8A) and velocity field FIG. 8B were generated by Stable Fluid, a physics-based fluid flow simulation technique, and rendered on top of three different textures (FIG. 8D). The recovered velocity field from one of the simulations in which the fluid was at 320° Celsius (FIG. 8C) is similar to the ground truth velocity field (FIG. 8B). Quantitative evaluation is given in (FIG. 8E). As expected, larger temperature-related index of refraction differences between the moving fluid and the background give better flow estimates.

To quantitatively evaluate the fluid velocity recovered by the disclosed refractive flow method, it on was also tested simulated sequences with precise ground truth reference. A set of realistic simulations of dynamic refracting fluid was generated using Stable Fluids, a physics-based fluid flows simulation technique, resulting in fluid densities and (2D) ground truth velocities at each pixel over time, as illustrated in FIGS. 8A-8B. The simulated densities were then used to render refraction patterns over several types of background textures with varying spatial smoothness (FIG. 8D). To render realistic refractions, it was assumed that the simulated flow was at a constant distance between the camera and background with thickness depending linearly on its density. Given a scene temperature (20° Celsius was used) and a temperature of the fluid, the amount of refraction at every point in the image can be computed. The refractive flow method previously described was then applied to the refraction sequences. The endpoint error of the recovered fluid motion at different temperature is shown in (FIG. 8E). All the sequences and results are available in the supplemental material provided hereinafter.

FIGS. 9A-9D illustrate a controlled experiment to evaluate the velocities estimated using a refractive flow method. (FIG. 9A) The experiment setup. (FIG. 9B) A representative frame from the captured video. (FIG. 9C) The mean velocity of the hot air blown by the hairdryer, as computed by our method, in meters per second (m/s). (FIG. 9D) Numerical comparison of our estimated velocities with velocities measured using a velometer, for the four points marked x1-x4 in FIG. 9C.

To demonstrate further that the magnitude of the motion computed by the refractive flow method is correct, a controlled experiment as shown in FIGS. 9A-9D. A velocimeter was used to measure the velocity of hot air blown from a hairdryer, the velocities were compared with the velocities extracted by the refractive flow method. To convert the velocity on the image plane to the velocity in the real world, the hairdryer was set parallel to the imaging plane and a ruler was placed on the same plane of the hairdryer. The velocity of the flow was measured at four different locations as shown in FIGS. 9C-9D. Although the estimated flow does not match the velocimeter flow exactly, they are highly correlated (FIG. 9D) and the agreement is believed to be accurate to within the experimental uncertainties.

Qualitative Results

Figure 10:
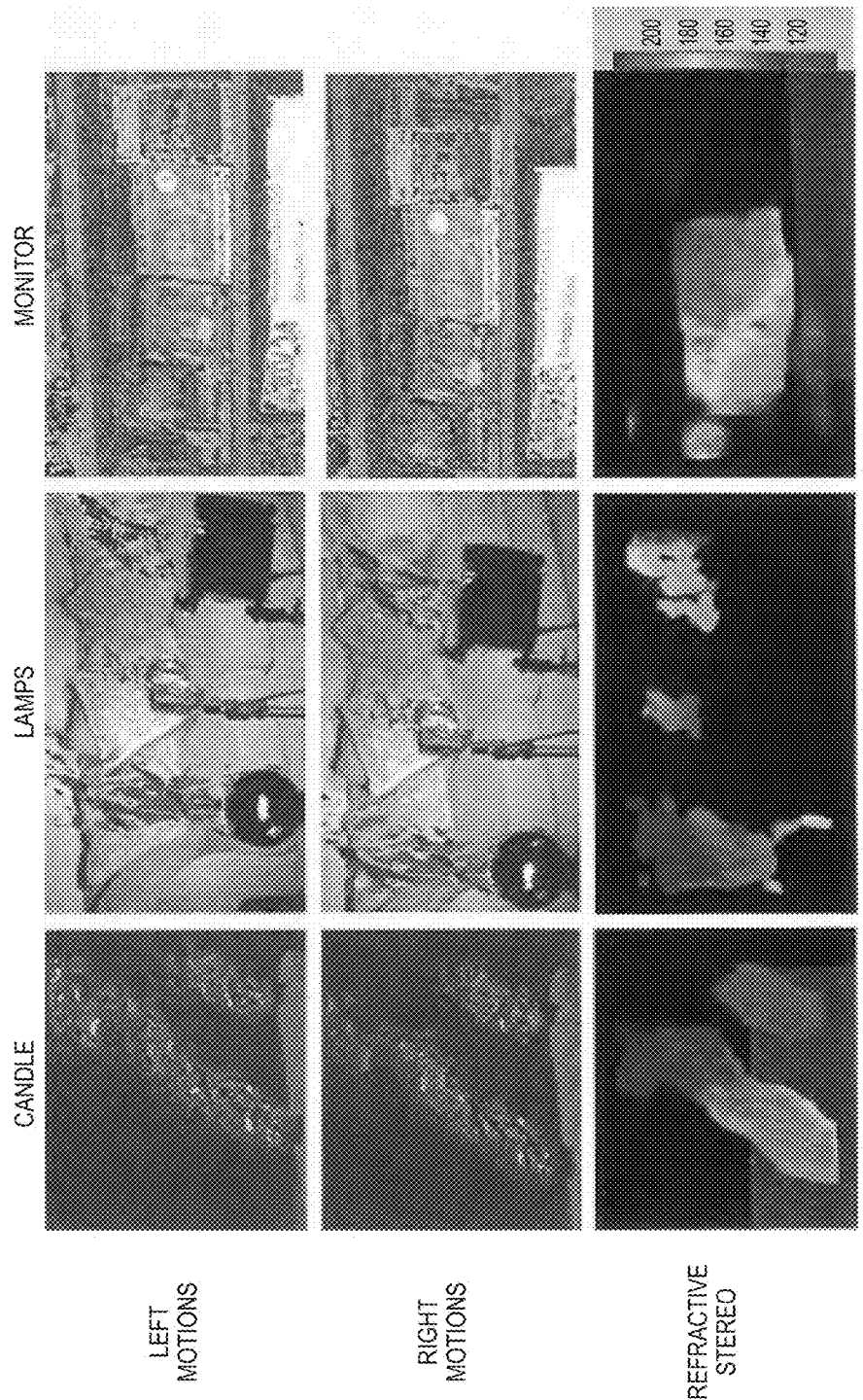
FIG. 10 is illustrates results of fluid depth measurements based on stereo video sequences.

FIG. 10 illustrates fluid depth recovery from stereo sequences. The first and second rows show the input videos overlayed by wiggle features (optical flow) calculated. third line shows the disparity map (weighted by the confidence of disparity) of the fluid object.

Several stereo sequences were captured using two cameras at acquiring images at 50 FPS. The two cameras were synchronized via genlock and a global shutter was used to avoid temporal misalignment. All videos were captured in 16 bit grayscale.

A controlled experiment to evaluate the velocities estimated by the method. (a) The experiment setup. (b) A representative frame from the captured video. (c) The mean velocity of the hot air blown by the hairdryer, as computed using the method, in meters per second (m/s). (d) Numerical comparison of our estimated velocities with velocities measured using a velometer, for the four points marked $x_1$-$x_4$ in (c).

The third row of FIG. 10 shows the disparity map of air flow. In the candle column are shown two plumes of hot air at different depth recovered. In lighting, three lights were positioned at different distances from the camera: the left one was the closest to the camera and the middle one was the furthest. The disparities of three plumes calculated in accordance with the method match the locations of the lights. In monitor, the method recovers the location of hot air rising from the top of a monitor. The right side of the monitor is closer to the camera, and so the hot air on the right has larger disparity. In the supplementary material given hereinafter are shown the recovered positions of the hot air as the heater rotates back and forth over time.

Quantitative Evaluation

A synthetic simulation was performed to demonstrate that probabilistic refractive stereo is robust to less-textured backgrounds. The simulation setup is similar to one used for the refractive flow method, and its details and the results are available in the supplementary material given hereinafter. The probabilistic framework allows for depth estimates of the flow even over image regions of only 1-dimensional structure.

Supplementary Material
Refractive Stereo: Quantitative Evaluation

Refractive stereo results were evaluated quantitatively in two ways. First, for natural stereo sequences, recovered depths of the refractive fluid layers were compared with those of the heat sources generating them, as computed using an existing stereo method (since the depth of the actual heat sources, being solid objects, can be estimated well using existing stereo techniques). More specifically, a region on the heat source was chosen and another region of hot air right above the heat source was chosen, and the average disparities in these two regions was compared. Experiments showed that the recovered depth map of the (refractive) hot air matches well the recovered depth map of the (solid) heat source, with an average error of less than a few pixels.

Second, the refractive stereo method was evaluated on simulated sequences with ground truth disparity. The simulation setup is similar to one used for the refractive flow method, except that the ground truth disparity map was manually specified as shown in FIGS. 11A-11B.

Figure 11A:
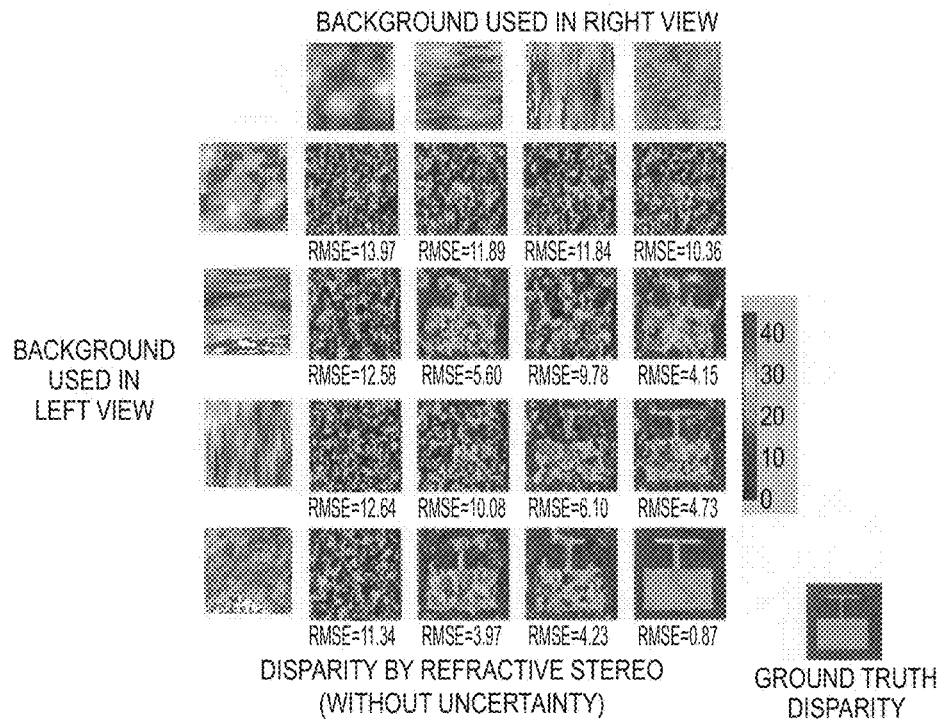
FIGS. 11A-11B illustrate the effect of background texturing on depth measurement results with and without uncertainty applied.
Figure 11B:
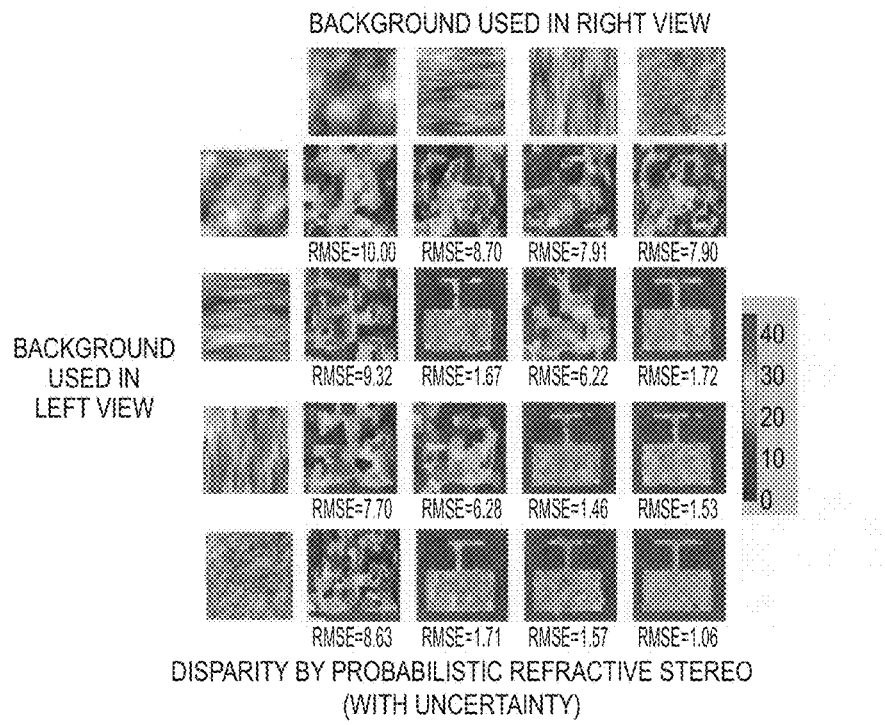

To evaluate the performance of the method, four different background patterns were generated as shown in FIGS. 11A-11B: 1) weakly textured in both x and y directions, 2) strongly textured in x direction, 3) strongly textured in y direction, 4) strongly textured in both directions. All combinations of these backgrounds were generated in the left and right views to yield 4×4=16 stereo sequences. For comparison, a refractive stereo method that does not consider the uncertainty in the optical flow was also implemented. FIGS. 11A-11B show the disparities recovered by both refractive stereo (without uncertainty; the baseline) and probabilistic refractive stereo (with uncertainty), together with their corresponding root-mean-square error (RMSE). The simple refractive stereo worked well when the backgrounds of both the left and right views were strongly textured in both the x and y directions. When the background was weakly textured in one direction, the optical flow in that direction was noisy and thus the recovered disparity would be significantly less accurate.

The probabilistic refractive stereo method was able to handle weaker textures. As long as one direction of the background was textured in both views, the disparity map was accurately recovered. For example, in the second row and second column in FIG. 1B, the optical flow in the x direction is noisy, while the optical flow in the y direction is clean, because the background is very smooth in x direction. In the probabilistic refractive stereo, the optical flow results were weighted by how accurately they are estimated when calculating the disparity. Therefore, the optical flow in the x direction would have a smaller effect on the final result than the optical flow in the y direction, and the disparity map would be calculated correctly. This demonstrates the robustness of the method to partially textured backgrounds.

Figure 12:
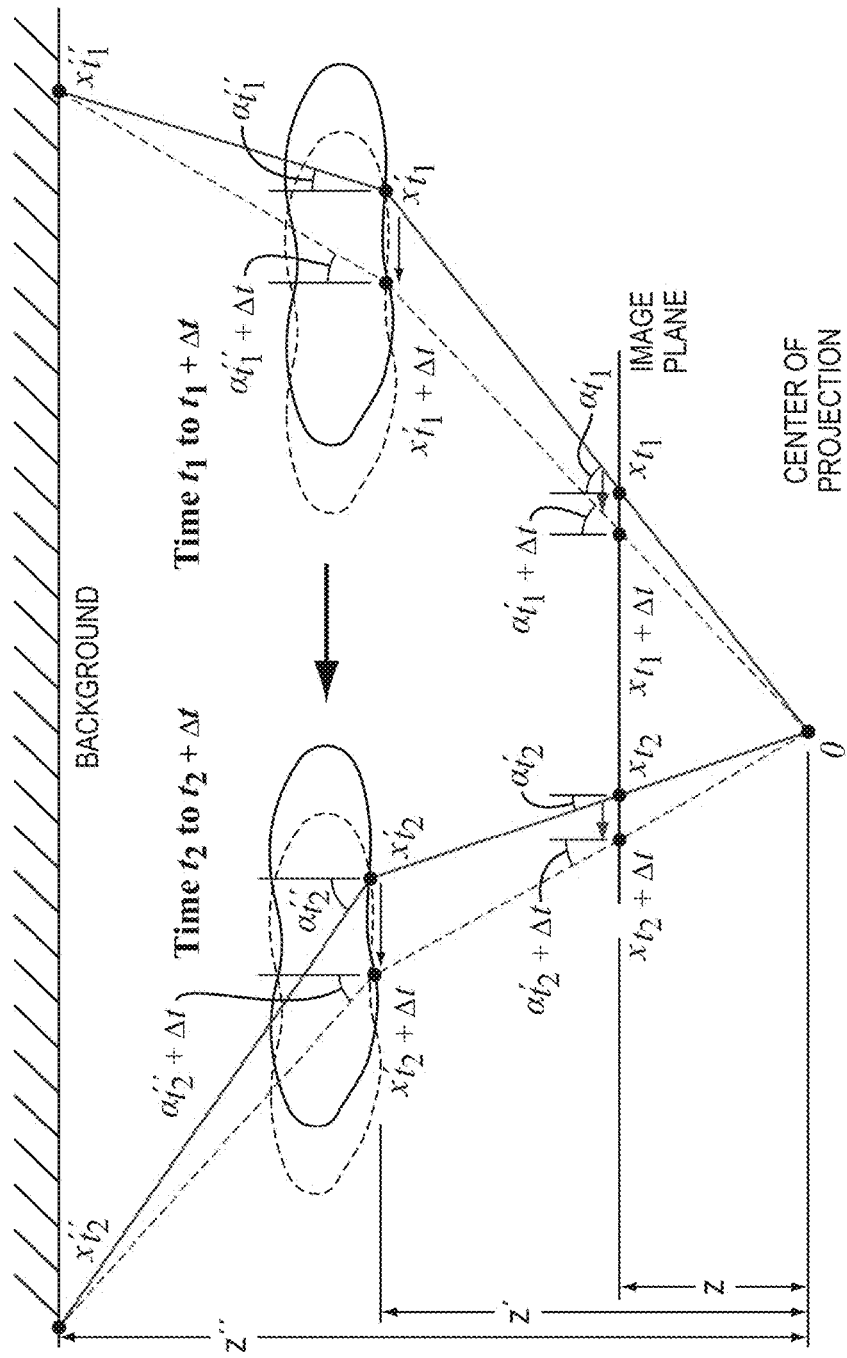
FIG. 12 illustrates quantities referred to in proving refractive constancy.

FIG. 12 is similar to FIG. 6B but also illustrates quantities relevant to a proof of refractive constancy. As described above, the refractive wiggle is defined as:

Definition 1 (Refraction wiggle) Let x' be a point on the refractive fluid layer, x" be the intersection between the background and the light ray passing through x' and the center of projection at time t, and $\Delta t$ be a short time interval. Then the wiggle of x' from time t to t+$\Delta t$ is the shift of the projection of x" on the image plane during this time.

This definition leads to the following two refractive constancy theorems.

Theorem 1 (Refractive flow constancy) Suppose the fluid object does not change its shape and index of refraction during a short time interval $[t_1, t_2]$. Then for any point on the fluid object, its wiggle $v(t_1)$ at $t_1$ equals its wiggle $v(t_2)$ at $t_2$.

Proof. Let $x'_{t_1}$ be the location of a point on the fluid object at time $t_1$, and $x'_{t_2}$ be the location of the same point at time $t_2$. It will be shown that the wiggles at these two points and times are the same.

Because wiggles are defined by shifts in the image plane, rays are first traced to determine what points in the image plane correspond to these locations on the fluid object. At time ti, i=1, 2, an undistorted ray is emitted from the center of the projection to point $x'_{t_i}$ with the angle $\alpha'_{t_i}$ with respect to vertical (solid lines in FIG. 2). This ray is bent by refraction as it passes through the fluid and travels at an angle $\alpha''_{t_i}$ with respect to the vertical before finally intersecting the background at $x''_{t_i}$.

At a successive time $t_i$+$\Delta t$, the fluid object moves to a new location (dashed gray blob in FIG. 12). The background point $x''_{t_i}$ then corresponds to a different point $x'_{t_i}$+$\Delta t$ on the fluid object and a different point $x_{t_i}$+$\Delta t$ on the image plane. The ray from the background to the fluid object now makes an angle of $\alpha'_{t_i}$+$\Delta t$ with the vertical and the same ray as it travels from the fluid object to the center of projection makes an angle of $\alpha'_{t_i}$+$\Delta t$ with the vertical. The wiggle at time $t_i$ is the distance between $x_{t_i}$ and $x_{t_i}$+$\Delta t$, denoted as $\overrightarrow{x_{t_i} x_{t_i}+\Delta t}$ (blue and red arrows in FIG. 12). It can be proven that the wiggles at time $t_1$ and $t_2$ are equal to each other. That is, $$\overrightarrow{x_{t_1} x_{t_1}+\Delta t} = \overrightarrow{x_{t_2} x_{t_2}+\Delta t}$$

To prove this, it will first be shown that $$\overrightarrow{x'_{t_1+\Delta t}} \quad \text{and} \quad \overrightarrow{x'_{t_2+\Delta t}}$$

same and are the same point on the fluid object, or equivalently, the shifts $x'_{t_1}x'_{t_1+\Delta t}$ and $x'_{t_2}x'_{t_2+\Delta t}$ are equal. By the definition of wiggle, it is known that $x'_{t_1}$ and $x'_{t_1}$ refer to the same point on the refractive object. It can be proven that $x'_{t_1}+\Delta t$ and $x'_{t_2}+\Delta t$ are equal.

Let z, z', and z'', respectively, be the depths of the image plane, the fluid layer, and the background from the center of projection (FIG. 2). To find the relationship between $x'_{t_1}+\Delta t$ and $x'_{t_2}+\Delta t$, $x'_{t_2}+\Delta t$ is solved for in terms of $x'_{t_1}$, $x'_{t_2}$, and $x'_{t_1}+\Delta t$. A simple geometric calculation shows (assuming that all the incident angle $\alpha'_{t_i}$ is small, so that $\alpha'_{t_i} \approx \sin(\alpha'_{t_i})$):

$$\frac{x'_{t_i} - o}{z'} = \alpha'_{t_i} \; (i = 1, 2),$$

$$\frac{x''_{t_i} - x'_{t_i}}{z'' - z'} = \alpha''_{t_i} \; (i = 1, 2).$$

The relationship between $\alpha'_{t_i}$ and $\alpha''_{t_i}$ is due to refraction and is determined by Snell's law. The first order paraxial approximation for small incident angles, as commonly used in the optics literature. The result is that Snell's refraction law is approximately an additive constant independent of the original ray direction.

$$\alpha''_{t_i} \approx \alpha'_{t_i} + \Delta \alpha_t(x_{t_i}).$$

The angle difference $\Delta \alpha t(x_{t_i})$ depends only on the normal direction of fluid object's surface at $x'_{t_i}$ and the fluid object's index of refraction, and is therefore independent of the incoming ray direction $\alpha'_{t_i}$. Because it is assumed that the fluid object does not change shape and index of refraction in the short time interval, the difference in angles also remains constant during the short time interval. Subtracting the first equation in this section from the second one results in:

$$\Delta \alpha_t = \alpha''_{t_i} - \alpha'_{t_i} = \frac{x''_{t_i} - x'_{t_i}}{z'' - z'} - \frac{x'_{t_i} - o}{z'} \; (i = 1, 2),$$

From which for $x'_{t_i}$ can be solved for in terms of the other variables:

$$x'_{t_i} - o = \frac{z'}{z''}(x''_{t_i} - o) - \frac{z'(z'' - z')}{z''}\Delta \alpha_t(x'_{t_i}) \; (i = 1, 2).$$

Similarly, we can solve for $x_{t_i}+\Delta t$:

$$x'_{t_i} - o = \frac{z'}{z''}(x''_{t_i} - o) - \frac{z'(z'' - z')}{z''}\Delta \alpha_t(x'_{t_i})(i = 1, 2).$$

Subtracting the previous two equations from each other yields a difference equation:

$$x'_{t_i+\Delta t} - x'_t = -\frac{z'(z'' - z')}{z''}(\Delta \alpha_{t_i+\Delta t}(x'_{t_i+\Delta t}) - \Delta \alpha_{t_i}(x'_{t_i}))(i = 1, 2).$$

Since $x'_{t_1}$ and $x'_{t_2}$ are the same point on the fluid object, differences between incidence angles and refraction angles should be same at $x'_{t_1}$ and $x'_{t_2}$, that is $\Delta \alpha_{t_1}(x'_{t_1}) = \Delta \alpha_{t_2}(x'_{t_2})$. Therefore, subtracting the previous equation with i=2 from the previous equation with i=1, yields $$(x'_{t_1+\Delta t} - x'_{t_1}) - (x'_{t_2+\Delta t} - x'_{t_2}) = $$
$$-\frac{z'(z'' - z')}{z''}(\Delta \alpha_{t_1+\Delta t}(x'_{t_1+\Delta t}) - \Delta \alpha_{t_2+\Delta t}(x'_{t_2+\Delta t})).$$

The quantity $x_{t_2}+\Delta t$ from the previous equation can then be solved for. If $x'_{t_2}+\Delta t$ and $x'_{t_2}\Delta t$ are also the same point on the fluid object, then the left hand side (LHS) of the previous equation is zero as $x'_{t_1+\Delta t} - x'_{t_1} = x'_{t_2+\Delta t} - x'_{t_2}$, and the right hand side (RHS) of the previous equation is also zero as $\Delta \alpha_{1+\Delta t}(x'_{t_2+\Delta t}) = \Delta \alpha_{t_2+\Delta t}(x'_{t_2+\Delta t})$. This shows that $x'_{t_2+\Delta t} = x'_{t_1+\Delta t} - x'_{t_1} + x'_{t_2}$ is the solution to the difference equation above, and therefore $x'_{t_1}+\Delta t$ and $x'_{t_2}+\Delta t$ are also the same point on the fluid object.

Finally, it is proven that wiggles at $t_1$ and $t_2$ are equal. By the similar triangle formula, we have:

$$\overrightarrow{x_{t_1}x_{t_1+\Delta t}} = \frac{z}{z'}\overrightarrow{x'_{t_1}x'_{t_1+\Delta t}} = \frac{z}{z'}\overrightarrow{x'_{t_2}x'_{t_2+\Delta t}} = \overrightarrow{x_{t_2}x_{t_2+\Delta t}}.$$

Theorem 2 (Refractive stereo constancy) Suppose there are n≥2 cameras imaging a refractive fluid object, and they are all parallel and close to each other. Then at any time t, and for any point on the fluid object, the corresponding wiggle in all the cameras is the same.

Figure 13:
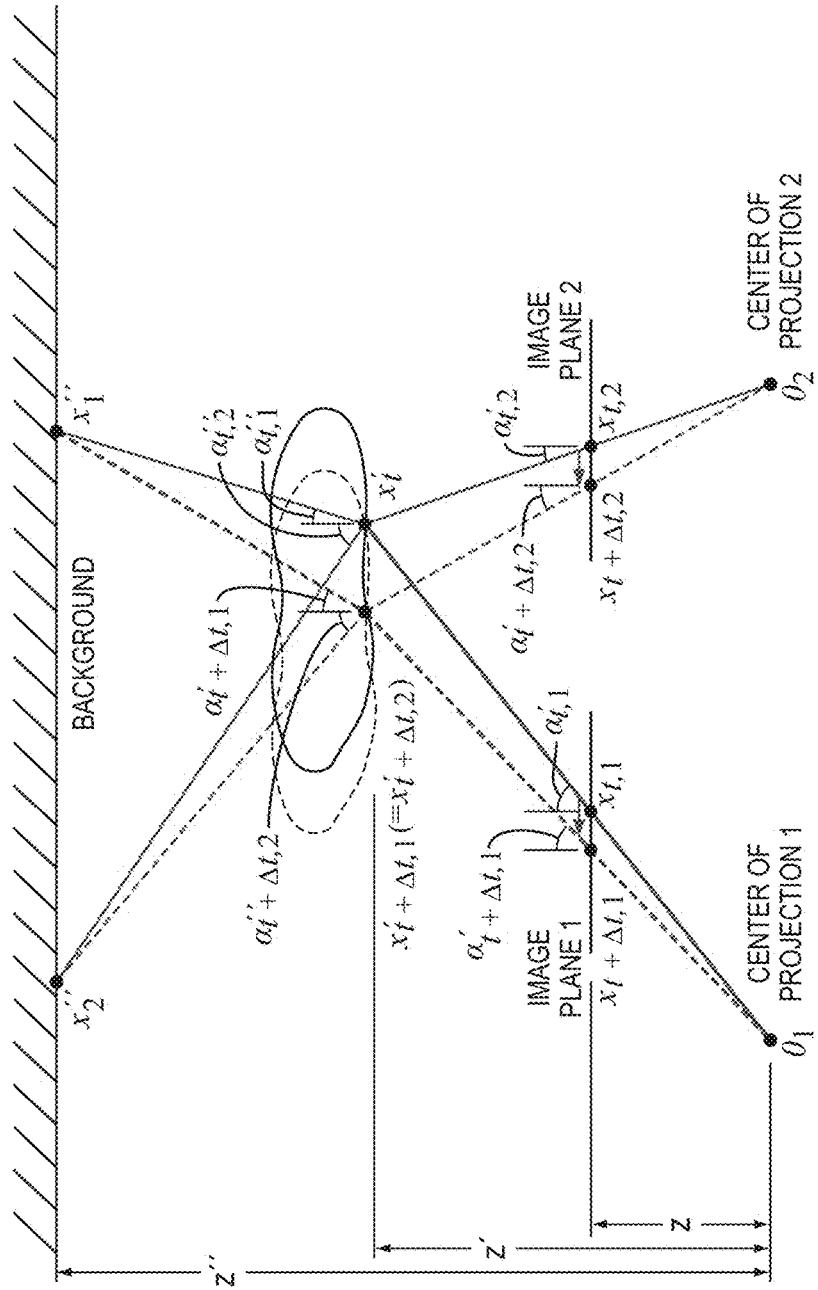
FIG. 13 illustrates quantities used in proving stereo refractive constancy.

FIG. 13 is similar to FIG. 6C but also illustrates quantities relevant to a proof of stereo refractive constancy.

Proof Similar to the previous proof, let x't be a point on the fluid object. Tracing rays, at time t, an undistorted ray is emitted from the center of the projection $o_j$(j=1, 2) to the point point $x'_t$. It is refracted by the fluid object and intersects the background at $x'_j$. At a successive time t+Δt, the fluid object moves, and the light ray from the points on the background to the center of the projection now goes through points $x'_{t+\Delta t,j}$ on the fluid object and $x_{t_j+\Delta t,j}$ on the image plane. It will be shown that the wiggle features $\overrightarrow{x_{t,1}x_{t+\Delta t,1}}$ and $\overrightarrow{x_{t,2}x_{t+\Delta t,2}}$ are equal in both views.

As in the previous proof, it is first shown that $x_{t+\Delta t,1} = x_{t+\Delta t,2}$. Following a similar derivation as in the previous proof results in:

$$x'_{t+\Delta t,j} - x'_t = -\frac{z'(z'' - z')}{z''}(\Delta \alpha_{t+\Delta t}(x'_{t+\Delta t,j}) - \Delta \alpha_t(x'_t)).$$

Then, subtracting the previous equation with j=2 from the previous equation with j=1, we have:

$$x'_{t+\Delta t,1} - x'_{t+\Delta t,2} = -\frac{z'(z'' - z')}{z''}(\Delta \alpha_{t+\Delta t}(x'_{t+\Delta t,1}) - \Delta \alpha_{t+\Delta t}(x'_{t+\Delta t,2})).$$

By the same logic as in the previous proof, when $x'_{t+\Delta t,1} = x'_{t+\Delta t,2}$, both the LHS and RHS of the previous equation are equal to 0. Therefore, $x'_{t+\Delta t,1} = x'_{t+\Delta t,2}$ is the solution to the previous equation.

Thus, $x'_{t+\Delta t,1}$ and $x'_{t+\Delta t,2}$ are the same point.

Finally, it can be proven that wiggles from two views are equal:

$$\overrightarrow{x_{t+\Delta t,1} x_{t,1}} = \frac{z}{z'} \overrightarrow{x'_{t+\Delta t,1} x'_t} = \frac{z}{z'} \overrightarrow{x'_{t+\Delta t,2} x'_t} = \overrightarrow{x_{t+\Delta t,2} x_{t+\Delta t,2}}.$$

Calculating Fluid Flow Efficiently

It was previously shown that the probabilistic refractive flow method consists of two steps. First, the mean $\bar{v}$ and the variance $\Sigma_v$ of the wiggle features v are solved for from the following Gaussian distribution:

$$\overrightarrow{x_{t+\Delta t,1} x_{t,1}} = \frac{z}{z'} \overrightarrow{x'_{t+\Delta t,1} x'_t} = \frac{z}{z'} \overrightarrow{x'_{t+\Delta t,2} x'_t} = \overrightarrow{x_{t+\Delta t,2} x_{t+\Delta t,2}}.$$

To solve for the mean and variance of flow from the previous equation, let the V be the vector formed by concatenating all the optical flow vectors in one frame. That is, V=( . . . , v(x), . . . ). Also, let us represent the previous equation in information form $P(v|I)=\exp(-\frac{1}{2}V^T JV + h^T V)$, where h and J can be calculated from the previous equation. Then the mean of V is $\bar{V}=J^{-1}h$ and covariance of V is $\Sigma=J^{-1}$.

In the second step, the fluid flow is calculated by minimizing the following optimization problem based on the mean and variance of the wiggle features computed in the first step.

$$\tilde{u} = \underset{u}{\mathrm{argmin}} \sum_x \beta_1 \left\| \frac{\partial \tilde{v}}{\partial x} u_x + \frac{\partial \tilde{v}}{\partial y} u_y + \frac{\partial \tilde{v}}{\partial t} \right\|^2_{\Sigma_v} + \beta_2 \left( \left\| \frac{\partial u}{\partial x} \right\|^2 + \left\| \frac{\partial u}{\partial y} \right\|^2 \right) + \beta_3 \|u\|^2$$

Calculating the covariance of each wiggle feature requires inverting the information matrix J. This step will be slow if the matrix is large. To avoid this time consuming inversion, we make a slight change to the fluid flow objective function. Let $\tilde{v}_x$, $\tilde{v}_y$, and $\bar{v}_t$ be the vectors formed by concatenating all the partial derivatives of mean wiggle features in a frame, that $$\tilde{V}_x = \left( \ldots, \frac{\partial v}{\partial x}(x), \ldots \right), \tilde{V}_y = \left( \ldots, \frac{\partial v}{\partial y}(x), \ldots \right),$$

$$\text{and } \tilde{V}_t = \left( \ldots, \frac{\partial v}{\partial t}(x), \ldots \right).$$

Similarly, let $U_x$, $U_y$ be the vectors formed by concatenating all the x-components and y-components of u in a frame respectively. Then the refractive flow can be calculated as follows:

$$\min_U \beta_1 (\tilde{V}_x \cdot U_x + \tilde{V}_y \cdot U_y + \tilde{V}_t)^T J(\tilde{V}_x \cdot U_x + \tilde{V}_y \cdot U_y + \tilde{V}_t) +$$

$$\beta_2 (\|D_x U_x\|^2 + \|D_y U_x\|^2 + \|D_x U_y\|^2 + \|D_y U_y\|^2) + \beta_3 \|U\|^2$$

where $D_x$ and $D_y$ are the partial derivative matrices to x and y respectively. The smoothness term of the previous equation is exactly the same as that in the equation for $\tilde{u}$ above, and the data term of the equation for $\tilde{u}$ above is $$(V_x \cdot U_x + V_y \cdot U_y + V_t)^T J(V_x \cdot U_x + V_y \cdot U_y + V_t) = \|V_x \cdot U_x + V_y \cdot U_y + V_t\|^2_{J^{-1}} = \|V_x \cdot U_x + V_y \cdot U_y + V_t\|^2_{\Sigma},$$

which is also similar to the data term in the equation for $\tilde{u}$ above except that it jointly considers all the wiggle vectors in a frame. Therefore, this change will not affect the result too much, but the method is more computationally efficient, as we never need to compute $J^{-1}$. The term never appears in the refractive flow expression above.

Probabilistic Interpretation in the Refractive Stereo

In this section, it is shown that the data term defined in Section 5 for refractive stereo is equal to the negative log of the conditional marginal distribution. Let $v_R(x) \sim N(\bar{v}_R(x), \Sigma_R(x))$ and $v_L(x+d(x)) \sim N(\bar{v}_L(x+d(x)), \Sigma_L(x+d(x)))$ be the optical flow from the left and right views, where $\bar{v}_L$ and $\bar{v}_R$ are the means of the optical flow and $\Sigma_L$ and $\Sigma_R$ are the variances of optical flow. Then the data term of the refractive stereo is $$f(v_R, v_L) = -\log \mathrm{cov}(v_L, v_R)$$

$$= -\log \int_v P_L(v) P_R(v) dv$$

$$= -\log \int_v N(v; \bar{v}_L, \Sigma_L) N(v; \bar{v}_R, \Sigma_R) dv$$

$$= \frac{1}{2} \log|\Sigma_L + \Sigma_R| + \frac{1}{2} \|\bar{v}_R - \bar{v}_L\|^2_{\Sigma_L + \Sigma_R} + \mathrm{const}$$

Where $N(v; \bar{v}_L, \Sigma_L)$ is shorthand notation for the Gaussian distribution probability density function $$N(v; \bar{v}, \Sigma) = \frac{1}{2\pi \sqrt{|\Sigma|}} \exp\left( -\frac{1}{2} \bar{v}^T \Sigma^{-1} \bar{v} \right)$$

Recall that the optical flow calculated by the method is degraded by noise. Specifically, let v(x) be the ground truth optical flow from the right view at x. The mean optical flow from the right view (or left view) calculated by the method equals the ground truth optical flow plus Gaussian noise with zero-mean and variance equal to $\Sigma_R$ (or $\Sigma_L$), that is:

$$P(\bar{v}_R(x)|v(x)) = N(\bar{v}_R(x); v(x), \Sigma_R(x)), P(\bar{v}_L(x+d(x))|v(x), d(x)) = N(\bar{v}_L(x+d(x)); v(x), \Sigma_L(x+d(x)))$$

To evaluate the probability of d, let us consider the marginal distribution $$P(\bar{v}_R(x), \bar{v}_L(x+d(x)) | (x)) = \int_v P(\bar{v}_R(x), \bar{v}_L(x+d(x)), v(x) | d(x)) dv(x) =$$

$$\int_v P(\bar{v}_R(x)|v(x)) P(\bar{v}_L(x+d(x)) | v(x), d(x)) P(v) dv(x) =$$

$$\int_v N(\bar{v}_R(x); v(x), \Sigma_R(x)) N(\bar{v}_L(x+d(x)); v(x), \Sigma_L(x+d(x))) P(v) dv(x)$$

Assuming that P(v) has an uniform prior, we have:

$$\log P(\bar{v}_R(x), \bar{v}_L(x+d(x)) | d(x)) =$$

$$\log \int_v N(\bar{v}_R(x); v, \Sigma_R(x)) N(\bar{v}_L(x+d(x)); v, \Sigma_L(x+d(x))) P(v) dv =$$

$$\log \int_v N(\bar{v}_R(x); v, \Sigma_R(x)) N(\bar{v}_L(x+d(x)); v, \Sigma_L(x+d(x))) dv + \mathrm{const} =$$

-continued $$\log \int_v N(v; \bar{v}_R(x), \Sigma_R(x))N(v; \bar{v}_L(x+d(x)), \Sigma_L(x+d(x)))dv + const =$$
$$-f(v_R, v_L) + const$$

Therefore, the data term is equal to the negative log of conditional marginal distribution (plus a constant).

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
 obtaining videos captured by at least two video cameras having respective imaging planes;
 by a processor, determining apparent motions of a refractive field, through which light passes from a textured background to the respective imaging planes, by analyzing changes in intensity or phase in the videos as a function of translations of intensities of elements of the refractive field;
 by the processor, determining actual motions of the refractive field by correlating, over time and space, representations of the apparent motions from frame to frame of the videos as a function of translations of refraction gradients of the elements of the refractive field; and
 calculating, based on the actual motions determined by correlating the representations of apparent motions over time and space, a depth of the actual motions of the refractive field.

2. The method of claim 1, further comprising determining, based upon the correlated representations, a three-dimensional velocity of the refractive field.

3. The method of claim 1, wherein the textured background is out-of-focus at at least one of the camera imaging planes.

4. The method of claim 1, wherein the imaging planes of the at least two video cameras are parallel to each other.

5. The method of claim 1, wherein correlating the representations of the apparent motions in the videos includes matching representations of apparent motions in one of the videos to representations of apparent motions in another of the videos.

6. The method of claim 1, wherein correlating the representations includes assuming that for each given time, and for a given spatial position in the videos, the representations of apparent motions corresponding to the given time and spatial position are the same from video-to-video.

7. The method of claim 1, further including determining an uncertainty of at least one of the depth of the refractive field and a velocity of the refractive field calculated from the correlated representations.

8. The method of claim 7, wherein determining the uncertainty includes weighting the representations of the apparent motions as a function of a variance of an optical flow related to the representations of the motions.

9. The method of claim 7, wherein determining the uncertainty includes defining weighted representations of motions to be a logarithm of a covariance between a representation of the apparent motion in one video and a representation of apparent motion in another video.

10. The method of claim 7, wherein determining the uncertainty includes weighting the representations of the apparent motions as a function of a degree of texturing of the textured background.

11. The method of claim 1, wherein correlating the representations of apparent motions includes correlating as a function of the translations of the refractive field through which light passes from a natural textured background to the respective imaging planes.

12. An apparatus comprising:
 memory configured to store videos obtained from at least two video cameras with respective imaging planes;
 a processor configured to determine apparent motions of a refractive field, through which light passes from a textured background to the respective imaging planes, by analyzing changes in intensity or phase in the videos as a function of translations of intensities of elements of the refractive field;
 the processor further configured to determine actual motions of the refractive field by correlating, over time and space, representations of the apparent motions from frame to frame of the videos as a function of translations of refraction gradients of the elements of the refractive field, and
 the processor being further configured to calculate, based on the actual motions determined by correlating the representations of apparent motions over time and space, a depth of the actual motions of the refractive field.

13. The apparatus of claim 12, wherein the processor is further configured to calculate a velocity of the refractive field based upon the correlated representations of the apparent motions.

14. The apparatus of claim 12, wherein the refractive field is a fluid.

15. The apparatus of claim 12, wherein the respective imaging planes are parallel to each other.

16. The apparatus of claim 12, wherein the processor is further configured to match the representations of the apparent motions obtained from one of the video cameras to the representations of the apparent motions obtained from another of the video cameras.

17. The apparatus of claim 12, wherein the processor is further configured to correlate the representations of the apparent motions using an assumption that for each given time, and for a given spatial position in the videos, the representations of the apparent motion corresponding to the given time and spatial position are the same in the videos.

18. The apparatus of claim 12, wherein the processor is further configured to determine an uncertainty of at least one of the depth of the refractive field and a velocity of the refractive field calculated from the correlated representations.

19. The apparatus of claim 18, wherein the processor is further configured to determine the uncertainty using a weighting of the representations of the apparent motions as a function of a variance of an optical flow related to the representations of the apparent motions.

20. The apparatus of claim 18, wherein the processor is further configured to determine the uncertainty using weighted representations of the apparent motions defined as a logarithm of a covariance between a representation of apparent motion in one video and a representation of apparent motion in another video.

21. The apparatus of claim 18, wherein the processor is further configured to determine the uncertainty using a weighting of the representations of the apparent motions, the weighting being a function of a degree of texturing of the textured background.

22. The apparatus of claim 12, wherein the textured background is a natural textured background.

23. The method of claim 1, wherein the at least two video cameras are microscopy video cameras, and wherein the correlating is done as a function of translations of a microscopic refractive field.

24. The method of claim 1, further including displaying the actual motions of the refractive field by way of representations in an augmented reality or virtual reality display.

* * * * *